United States Patent [19]

Ito et al.

[11] Patent Number: 5,666,580
[45] Date of Patent: Sep. 9, 1997

[54] PSEUDO TELEPHOTOGRAPHIC CAMERA AND CAMERA HAVING PSEUDO TELEPHOTOGRAPHIC MODE

[75] Inventors: Takayuki Ito; Yukio Takaoka; Kazuki Yazawa, all of Tokyo, Japan

[73] Assignee: Asahi Kogaku Kogyo Kabushiki Kaisha, Tokyo, Japan

[21] Appl. No.: 534,450

[22] Filed: Sep. 27, 1995

[30] Foreign Application Priority Data

Sep. 30, 1994 [JP] Japan .................. 6-237524
Feb. 2, 1995 [JP] Japan .................. 7-015783

[51] Int. Cl.⁶ .................. G03B 35/00; G03B 1/00
[52] U.S. Cl. .................. 396/335; 396/340; 396/60
[58] Field of Search .................. 354/94, 110, 111, 354/120, 125, 159; 396/60, 335, 337, 340; 352/62, 69, 70, 65

[56] References Cited

U.S. PATENT DOCUMENTS

| | | | |
|---|---|---|---|
| 4,249,812 | 2/1981 | Hall | 354/120 |
| 4,384,774 | 5/1983 | Tuck | 354/159 |
| 5,003,340 | 3/1991 | Harvey | 354/456 |
| 5,010,357 | 4/1991 | Misawa . | |
| 5,138,460 | 8/1992 | Egawa | 358/224 |
| 5,210,557 | 5/1993 | Kameyama et al. | 354/120 |
| 5,335,031 | 8/1994 | Ogawa . | |
| 5,376,982 | 12/1994 | Takahashi | 354/159 |
| 5,386,259 | 1/1995 | Ichikawa et al. . | |
| 5,412,443 | 5/1995 | Suzuka . | |
| 5,424,792 | 6/1995 | Mikami | 354/120 |
| 5,444,508 | 8/1995 | Okoyama | 354/120 |

*Primary Examiner*—Michael L. Gellner
*Assistant Examiner*—Daniel Chapik
*Attorney, Agent, or Firm*—Greenblum & Bernstein, P.L.C.

[57] ABSTRACT

A pseudo telephotographic camera includes a photographing device which photographs pictures in two separate pseudo telephotographic frames which together define a panoramic size picture frame. The panoramic size picture frame is formed by optically intercepting the upper and lower portions of a standard frame on a film. The pseudo telephotographic frames are formed on a left and right half of the panoramic size frame by a first mask and a second mask. Alternatively, the pseudo telephotographic frames are formed with a center mask and by moving the film in a predetermined sequence to expose a left half and a right half of the panoramic size frame.

20 Claims, 16 Drawing Sheets

FR   FP

PSEUDO TELEPHOTOGRAPHIC CAMERA AND CAMERA HAVING PSEUDO TELEPHOTOGRAPHIC MODE

BACKGROUND OF THE INVENTION

1. Field of the Invention

The present invention relates to a pseudo telephotographic camera in which a telephoto effect print can be produced from a negative of a picture which has been taken using various fixed-focus length lenses or zoom lenses, etc., using the existing printing system for panoramic photography.

2. Description of Related Art

Recently, cameras in which a standard picture mode and a panoramic picture mode can be optionally selected have been widely used. Where a roll of film contains both mixed standard size pictures and panoramic size pictures, the standard size frames for taking the standard size pictures, and then panoramic size frames for taking the panoramic size pictures the frames, are automatically discriminated when printed in a photofinishing laboratory to obtain standard size prints (so-called service size prints) and panoramic size prints. The magnification (enlargement) ratio of the standard size and the panoramic size is approximately 1:2 (1:4 in surface area ratio). Namely, the panoramic size picture enjoys around twice as much telephoto effect as that of the standard size picture. In other words, if a panoramic size picture and a standard size picture are taken by a photographing lens, the panoramic size picture can enjoy the same amount of telephoto effect as a picture taken by a photographing lens whose focal length is approximately twice that of the photographing lens used to take the panoramic sized picture. It is expected that a panoramic size picture which can be automatically printed and produced from a film which contains a mixture of both the standard size and panoramic size pictures will prevail in the future and the cost of the panoramic size pictures will be decreased.

During the trimming process in which the normal negative is partly enlarged and printed, printing must be manually effected by an operator, and hence is expensive. It is likely that the cost of this process will increase in the future.

SUMMARY OF THE INVENTION

It is an object of the present invention to provide a camera in which a telephoto effect print can be obtained at a low cost, using existing inexpensive automatic printing system as for a panoramic size picture.

The basic concept of the present invention has been conceived from the fact that the lengths of the minor and major sides of the panoramic size picture are substantially identical to and twice the lengths of the minor and major sides of the standard size picture, respectively. Also, the panoramic size picture is equivalent to a print which is obtained by trimming about one-half of the surface area of the standard size negative and printing the same so to be of a size about twice the standard size. Based on this discovery, it has been found that if two pictures are taken in two left and right frames within a panoramic size and are then printed as a panoramic size picture, two prints having a telephoto effect can be obtained by cutting the left and right frames.

Namely, according to an aspect of the present invention, there is provided a pseudo telephotographic camera comprising a device for defining two separate pseudo telephotographic frames, which substantially define a panoramic size in total, the two separate pseudo photographing frames being formed on right and left halves of the panoramic size frame of, for example, a 35 mm film which is formed by optically intercepting at upper and lower portions of a standard size frame on a film; and a device for photographing pictures in said two separate pseudo telephotographic frames independently. According to another aspect of the present invention, there is provided a camera having a pseudo telephotographic mode, comprising a selector for selecting a standard picture frame, a panoramic picture frame, and two separate pseudo telephotographic picture frames on right and left halves of the panoramic picture frame; and a device for photographing pictures in the standard picture frame, said panoramic picture frame, and each of the two separate pseudo telephotographic frames in accordance with the selection of said selecting means.

To selectively obtain the three kinds of picture frames, according to the present invention, a camera comprises four aperture plates which are provided on upper, lower, right and left portions in a camera body to independently move between a close position in which the aperture plates come close to an optical axis of a photographing lens and a far position in which the aperture plates come away from the optical axis. The aperture plates define a standard frame for a standard picture when the four apertures plates are all located in their respective far positions. The aperture plates define a panoramic frame for a panoramic picture when the upper and lower aperture plates are located in their respective close positions, and when the right and left aperture plates are located in their respective far positions. The aperture plates define a pseudo telephotographic frame for a pseudo telephoto picture when the aperture plates are all located in their respective close positions.

The present disclosure relates to subject matter contained in Japanese Patent Application Nos. 6-237524 (filed on Sep. 30, 1994) and 7-15783 (filed on Feb. 2, 1995) which are expressly incorporated herein by reference in their entireties.

BRIEF DESCRIPTION OF THE DRAWINGS

The invention will be described below in detail with reference to the accompanying drawings, in which.

DESCRIPTION OF THE PREFERRED EMBODIMENT

Embodiments of the present invention will be discussed below.

Figure 1:
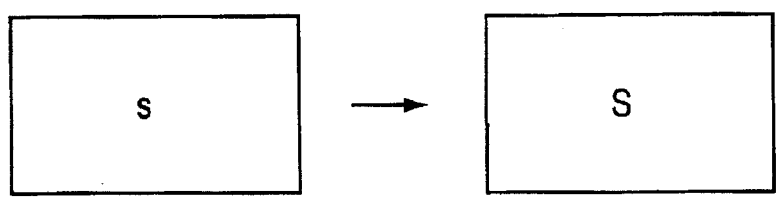
FIG. 1 is a schematic view of a standard size negative which is printed to obtain a standard size print at a magnification of 1.
Figure 2:
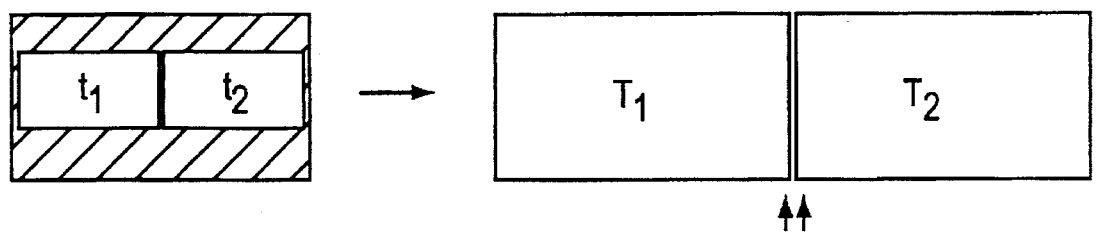
FIG. 2 is a schematic view of a panoramic size negative which is printed to obtain a panoramic size print at a magnification of 2, in telephoto-effect photography, according to the present invention.

FIGS. 1 and 2 show the basic concept of the present invention. For clarity, it is assumed that the size of the standard picture frame (negative) "s" formed on 35 mm size film is identical to the size of the print S in FIG. 1. In the present invention, the upper and lower ¼ portions of the standard picture frame "s" are optically intercepted in the panoramic mode as shown in FIG. 2, and pictures are taken in separate left and right split frames (pseudo telephoto frames) $t_1$ and $t_2$, in the panoramic size picture frame. The split frames are printed at a panoramic size and cut to obtain prints $T_1$ and $T_2$. As can be seen in FIGS. 1 and 2, the prints $T_1$ and $T_2$ are twice the size in length and four times the size in surface area of the print S (double telephoto-effect). Namely, if the standard picture frame "s" and the pseudo telephoto frames $t_1$, $t_2$ are taken by the same photographing lens (i.e., at the same focal length), the focal length for the prints $T_1$ and $T_2$ is deemed to be approximately twice the focal length for the print S. The prints $T_1$ and $T_2$ will be referred to hereinafter as pseudo telephoto prints. According to one of the most significant features of the present invention, the pseudo telephoto print can be obtained merely by printing as a panoramic picture without relying upon a special trimming operation. Namely, it is presumed in the present invention that the negative which contains the pseudo telephoto frames $t_1$ and $t_2$ shown in FIG. 2 is recognized to be a panoramic picture and is accordingly printed as a panoramic print at a photofinishing laboratory.

Figure 3:
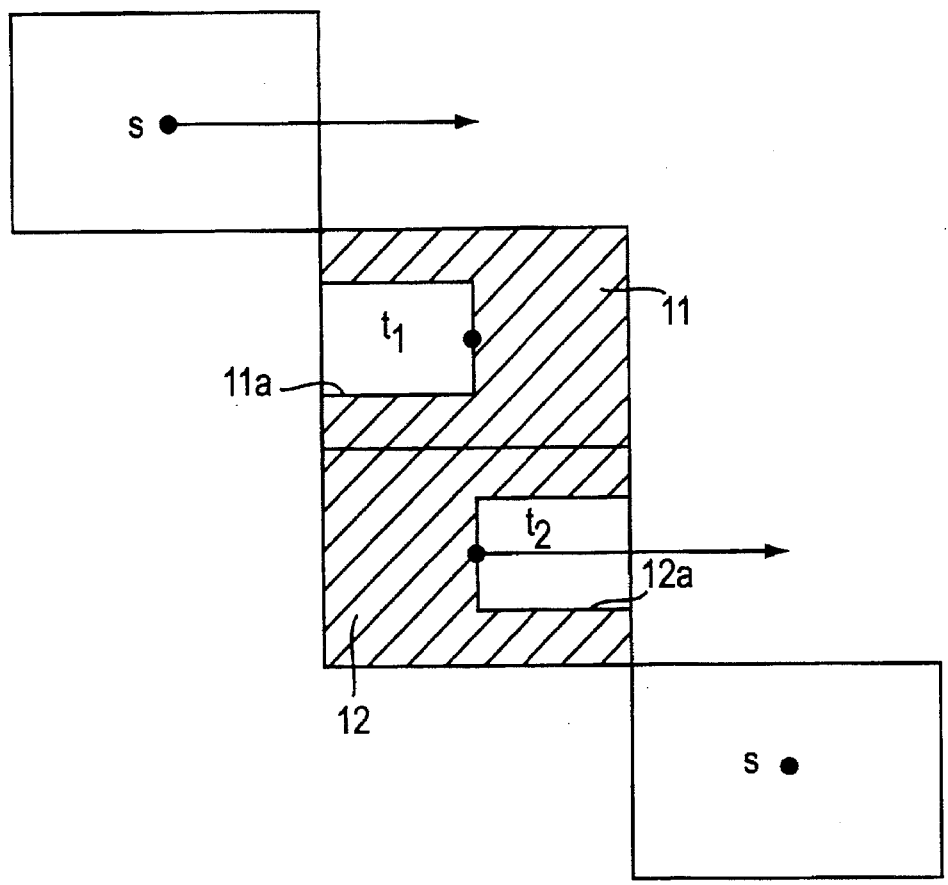
FIG.3 is a schematic view of an aperture mask and a film to be fed in telephoto-effect photography, according to a first embodiment of the present invention.

FIG. 3 shows a first embodiment of a mask and a film feed system to obtain two pseudo telephoto frames between two adjacent standard picture frames. If the pseudo telephoto mode (single mode) is selected, when the standard frame "s", which has not been photographed, reaches the (standard picture photographing) aperture of the camera, a first mask 11 is located in front of the aperture, as shown in FIG. 3. The first mask 11 is provided with an opening 11a corresponding to the pseudo telephoto frame $t_1$ which is located on the left half of the panoramic picture frame, so that the portion other than the opening 11a is intercepted from light. In this state, when photographing is carried out, a picture corresponding to the pseudo telephoto frame $t_1$ is taken on the left half of the panoramic picture frame of the film through the opening 11a, as shown in FIG. 2. Thereafter, a second mask 12 is located in front of the aperture, instead of the first mask 11. The second mask 12 is provided with an opening 12a corresponding to the pseudo telephoto frame $t_2$ which is located on the right half of the panoramic picture frame, so that the portion other than the opening 12a is intercepted from light. The shutter charging is effected upon exchanging the first mask 11 with the second mask 12 and vice versa. In this state, when photographing is carried out, a picture corresponding to the pseudo telephoto frame $t_2$ is taken on the right half of the panoramic picture frame of the film through the opening 12a, as shown in FIG. 2. In order that two pseudo telephoto frames $t_1$ and $t_2$ are photographed, it is not permitted to change the pseudo telephoto mode (single mode) to the standard picture mode. Thus there are continuous pseudo telephoto frames $t_1$ and $t_2$, which allows panoramic printing to be carried out.

Figure 4:
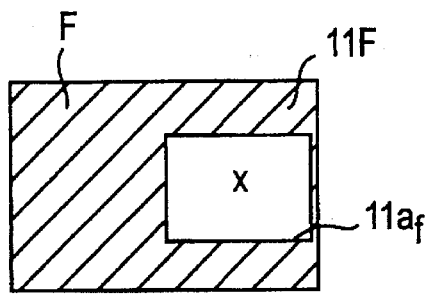
FIG. 4 is a view showing an example of a field of view of a finder in the embodiment shown in FIG. 3.
Figure 4:
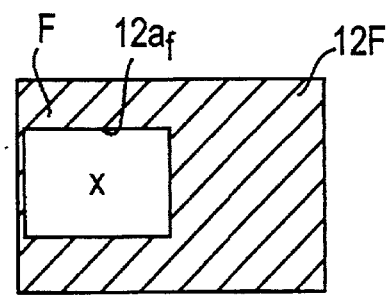

FIG. 4 shows an example of a finder mask in the pseudo telephoto mode. Finder masks 11F and 12F corresponding to the first and second masks 11 and 12 are alternately brought into the field of view F of the finder in the standard picture mode. The finder masks 11F and 12F are provided with finder openings 11af and 12af corresponding to the openings 11a and 12a, respectively. In this embodiment, the film can be advantageously fed frame (standard picture frame) by frame. However, since the pictures corresponding to the pseudo frames $t_1$ and $t_2$ are taken by light transmitted through the peripheral portion of the photographing lens, problem may be caused due to aberrations.

Figure 5:
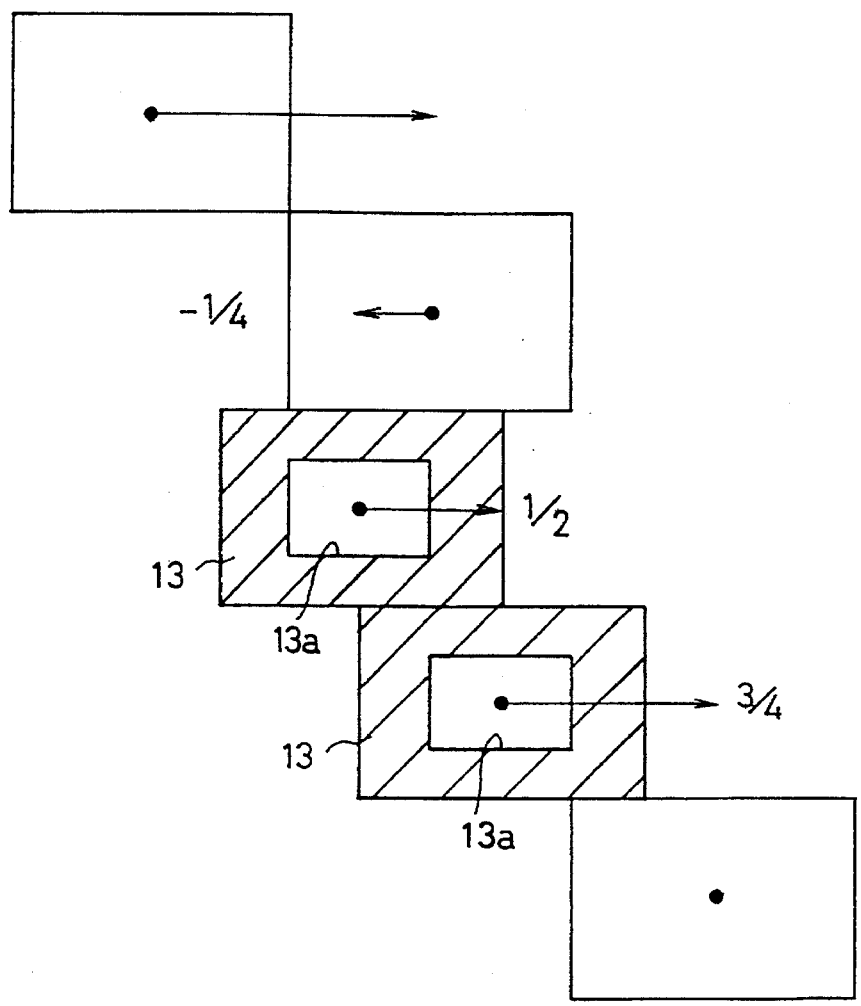
FIG. 5 is a schematic view of an aperture mask and a film to be fed in telephoto-effect photography, according to a second embodiment of the present invention.
Figure 6:
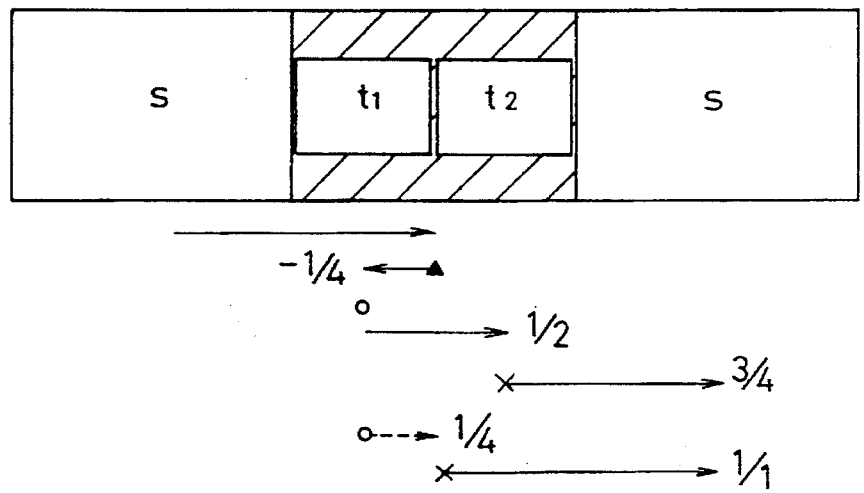
FIG. 6 is a view showing control of the feed of the film in a pseudo telephoto mode (single mode) using the mask shown in FIG. 5.

To solve this problem, a modified embodiment is shown in FIG. 5 in which the picture is always taken by light transmitted through the center portion of the photographing lens. To this end, a mask 13 which is provided on the central portion thereof with an opening 13a corresponding to the pseudo telephoto frame is used. The mask 13 does not move. FIG. 5 shows a relative positional relationship between the mask 13 and the film. The opening 13a of the mask 13 is always located in front of the aperture when the pseudo photographing mode is selected. FIG. 6 shows a first embodiment of the feed of the film upon taking a picture in a pseudo telephoto mode using the mask 13. If the pseudo telephoto mode (single mode) is selected (as indicated by ▲ in FIG. 6), when the standard picture frame "s", which has not yet been photographed, reaches the (standard picture photographing) aperture of the camera, the mask 13 is located in front of the aperture in FIG. 5. At the same time, the film is rewound by ¼ frame. In this state, if a picture is photographed, the pseudo telephoto frame $t_1$ of the film on the left half of the panoramic picture frame in FIG. 6 is taken through the opening 13a.

Thereafter, the film is advanced by ½ frame, and during the advance of the film, the shutter charging is carried out. In this state, when photographing is carried out, a picture corresponding to the pseudo telephoto frame $t_2$ is taken on the right half of the panoramic picture frame of the film through the opening 13a, as shown in FIG. 6. Before photographing of the pictures for the two pseudo telephoto frames $t_1$ and $t_2$ is completed, it is not permitted to change from the pseudo telephoto mode (single mode) to the standard picture mode, similar to the case shown in FIG. 3. The symbol ○ represents that the pseudo telephoto mode (single mode) can be released, and the symbol ○ with the dotted line and the arrow designate the actual movement of the film when the pseudo telephoto mode is released.

Upon completion of the photographing operation for the two frames in the pseudo telephoto mode, the film is fed by ¾ frame, so that the mode is returned to the standard picture mode. During the feed of the film by ¾ frame, the mask 13 is retracted from the aperture and the shutter charging is effected.

If the pseudo telephoto mode (single mode) is first selected and is then released, the film is fed in the forward direction by ¼ frame, and the mask 13 is retracted from the aperture. In this state, if normal photographing is effected, the film is advanced by one frame for the subsequent standard shot, and the shutter is charged.

Figure 7:
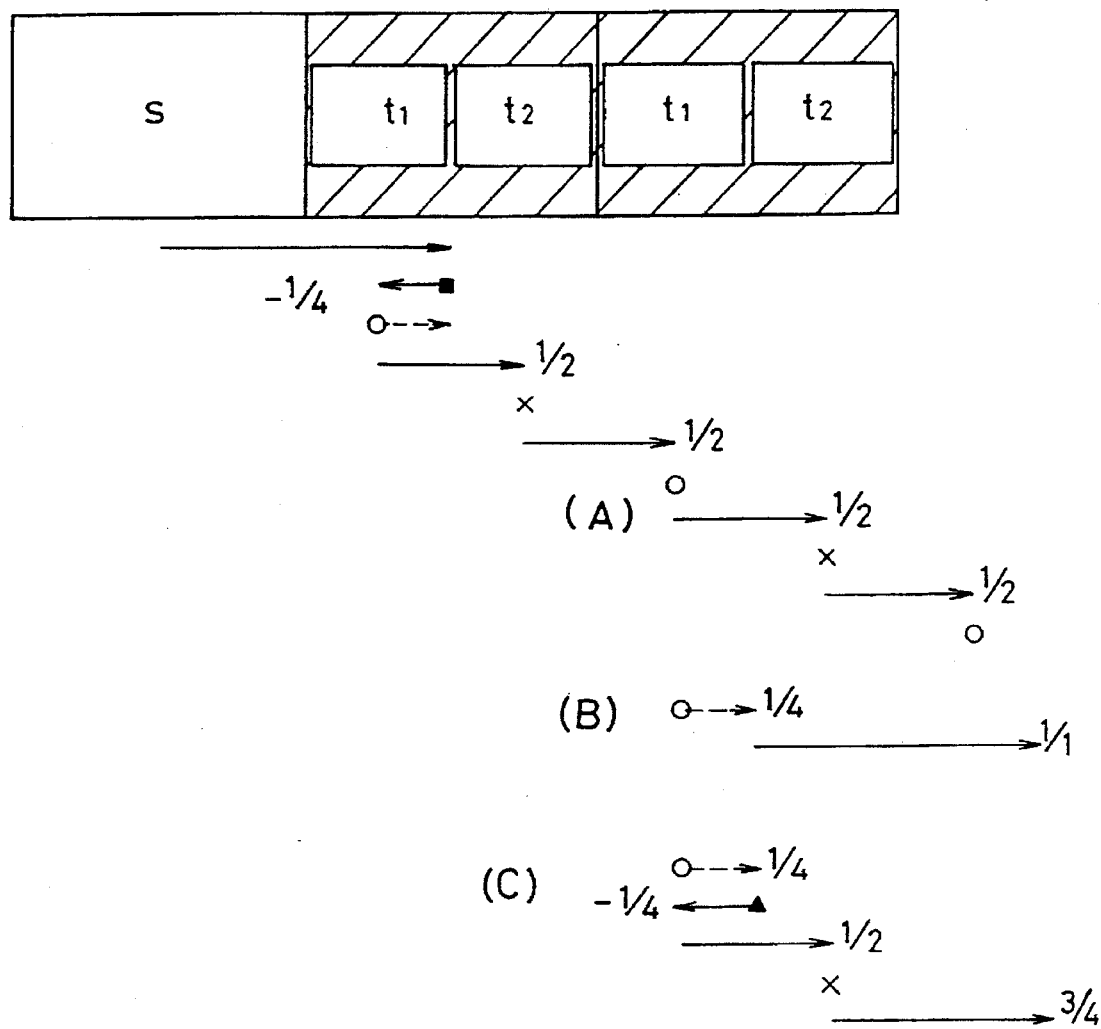
FIG. 7 is a view showing control of the feed of the film in a pseudo telephoto mode (continuation mode) using the mask shown in FIG. 5.

FIG. 7 shows a second embodiment of the film feeding system used to feed a film which contains a mixture of pseudo telephoto frames and standard picture frames, using the mask 13 shown in FIG. 5. If the pseudo telephoto mode (continuation mode) is selected (as indicated by ■ in FIG. 7), when the standard picture frame "s", which has not yet been photographed, reaches the (standard picture photographing) aperture of the camera, the mask 13 is located in front of the aperture. At the same time, the film is rewound by ¼ frame. In this state, if a picture is photographed, the pseudo telephoto frame $t_1$ of the film on the left half of the panoramic picture frame in FIG. 7 is taken through the opening 13a.

Thereafter, the film is advanced by ½ frame, and the shutter is charged. In this state, when photographing is carried out, a picture corresponding to the pseudo telephoto frame $t_2$ is taken on the right half of the panoramic picture frame of the film through the opening 13a, as shown in FIG. 7. Before photographing of the pictures for the two pseudo telephoto frames $t_1$ and $t_2$ is completed, it is not permitted to change from the pseudo telephoto mode (continuation mode) to the standard picture mode, as indicated by x in FIG. 7, similarly to the pseudo telephoto mode (single mode). Similar operations are repeated until the pseudo telephoto mode (continuation mode) is released.

If the pseudo telephoto mode (continuation mode) is released, the film is fed by ¼ frame, so that the mask is retracted and the mode is returned to the standard picture mode. If the pseudo telephoto mode (single mode) is selected after the pseudo telephoto mode (continuation mode) is released, the control is the same as that of FIG. 6. Diagrams (A),(B) and (C) in FIG. 7 show the feed of the film when the pseudo telephoto mode (single mode) is selected, when the pseudo telephoto mode is released, and when the pseudo telephoto mode is reset after it is released, respectively.

Figure 8:
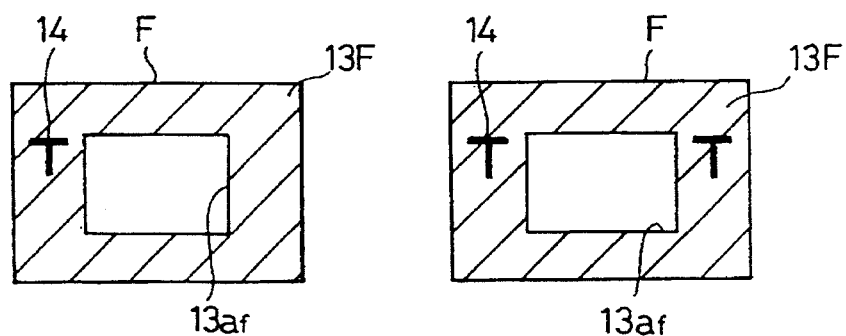
FIG. 8 is a view showing an example of the field of view of a finder in the embodiment shown in FIG. 5.

FIG. 8 shows an example of a finder mask in the pseudo telephoto mode. The finder mask 13F, having the opening 13af corresponding to the opening 13a of the mask 13, is moved into the finder field of view F in the standard picture mode. It is possible to indicate in the finder mask 13F whether the single or continuation pseudo telephoto mode is selected, or whether the pseudo telephoto mode can be released. In FIG. 8, a pair of marks 14 representing the pseudo telephoto mode is shown. When one of the marks 14 is lit, the pseudo telephoto mode can be released; and when both the marks 14 are lit, the pseudo telephoto mode cannot be released.

Figure 9:
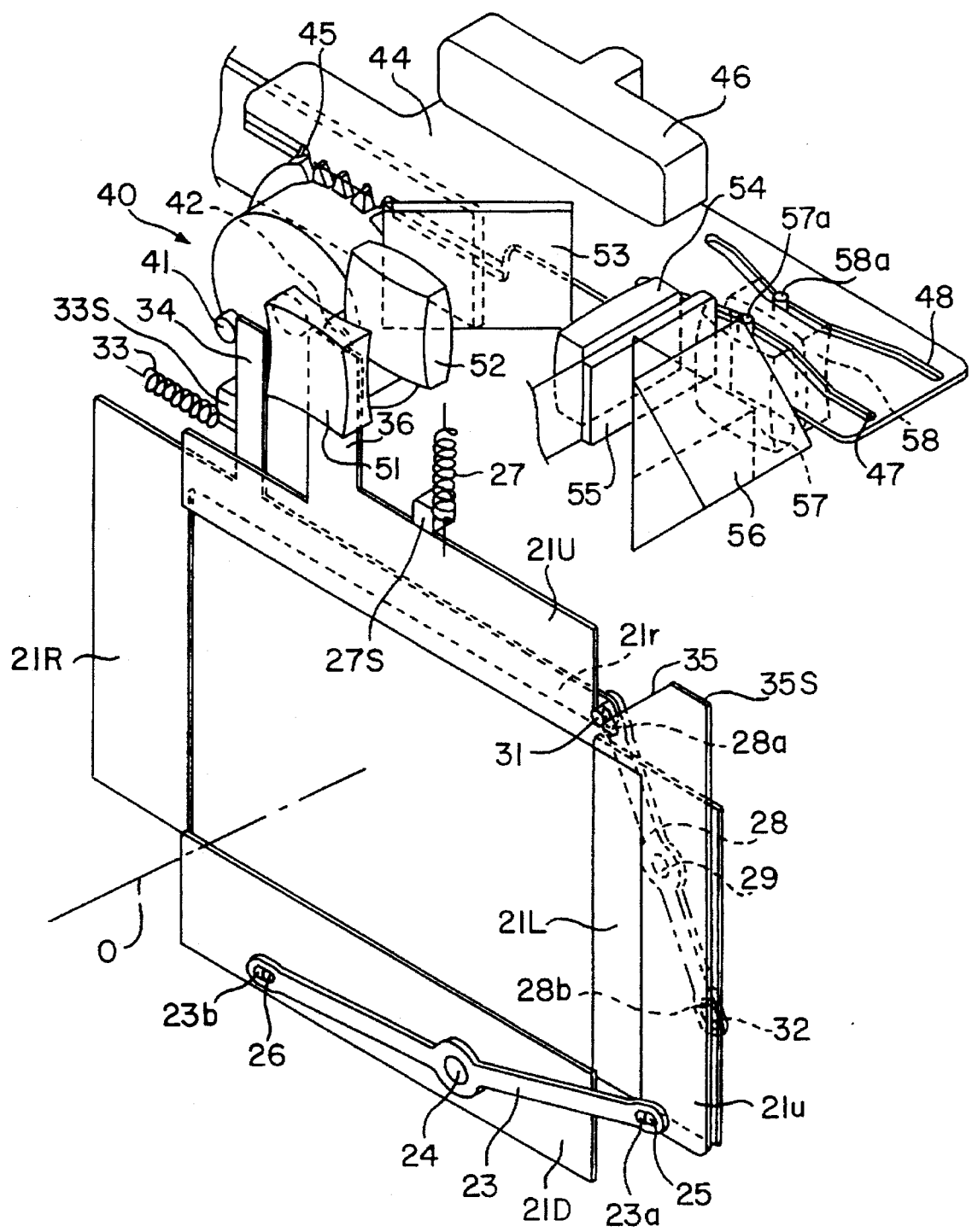
FIG. 9 is a perspective view of a first embodiment of an aperture varying mechanism to select a standard picture photographing aperture, a panoramic picture photographing aperture, and a pseudo telephoto picture photographing aperture.
Figure 10:
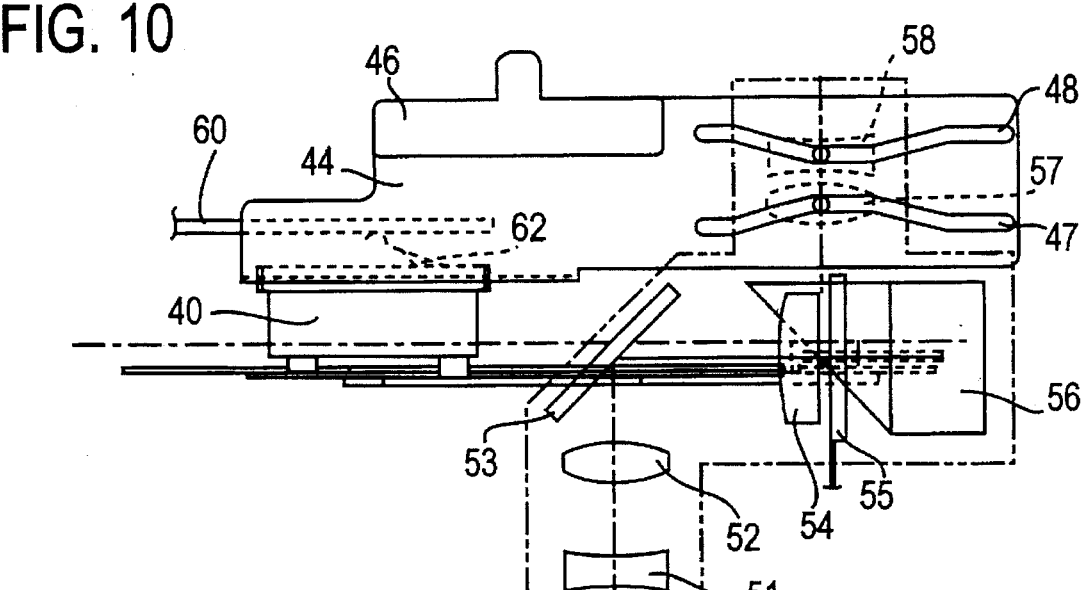
FIG. 10 is a plan view of the aperture varying mechanism shown in FIG. 9, in a standard picture mode.
Figure 11:
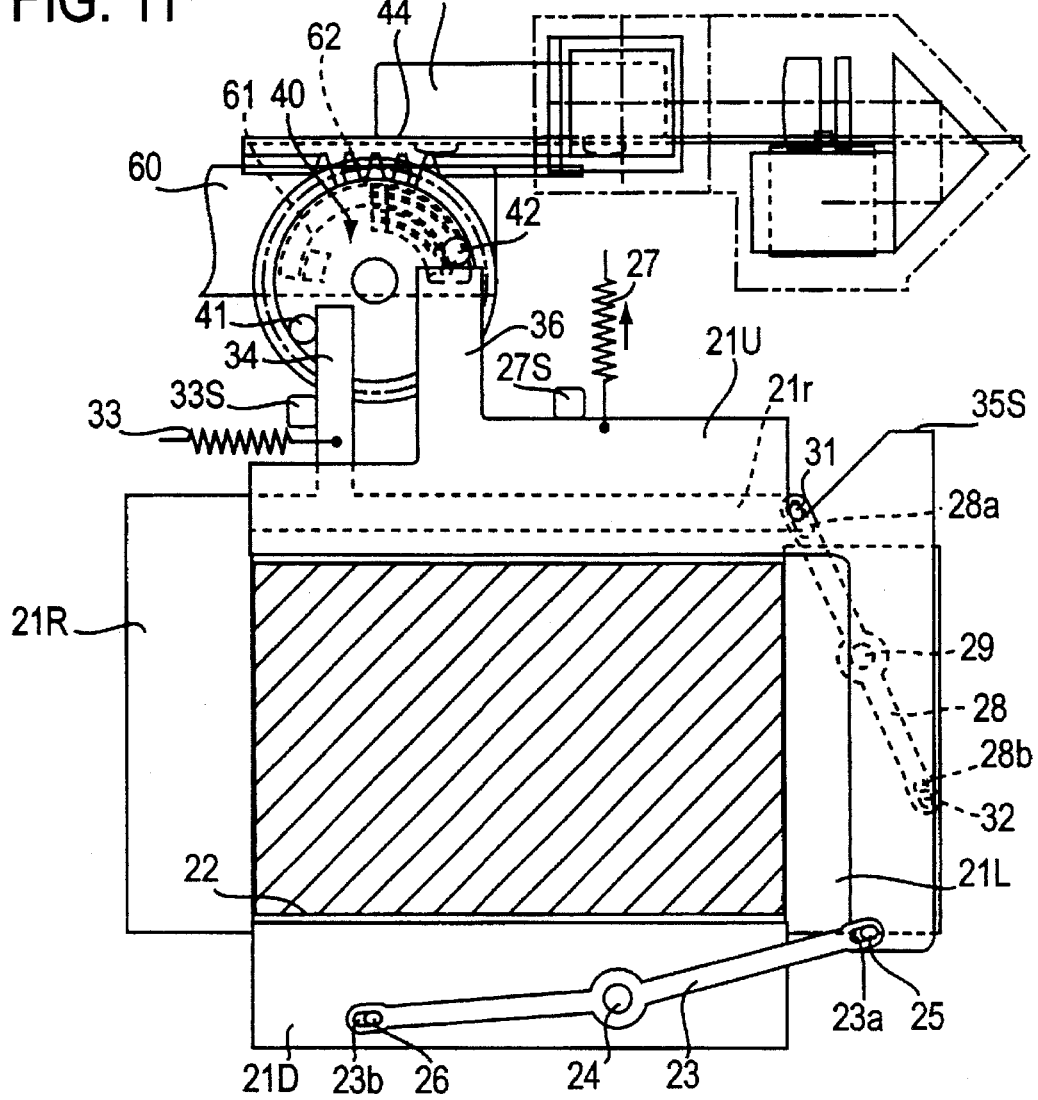
FIG. 11 is a front elevational view of the aperture varying mechanism shown in FIG. 9, in a standard picture mode.

FIGS. 9 through 16 show a first embodiment of the aperture varying mechanism which can select either of the standard picture mode, the panoramic picture mode, or the pseudo telephoto mode. In FIG. 9, "O" designates the optical axis of the photographing lens (not shown). There are four aperture plates 21U, 21D, 21R and 21L in the camera body, that determine the film area to be exposed by light transmitted through the photographing lens. The aperture plate 21U defines the upper edge of the rectangular exposure area; the aperture plate 21D defines the lower edge thereof; the aperture plate 21R defines the right edge; and the aperture plate 21L defines the left edge, respectively. In the illustrated embodiment, the standard picture frame, the panoramic picture frame, and the pseudo telephoto frame can be selected by the aperture plates. The standard picture frame can also be determined by another stationary member having a stationary aperture 22 (FIG. 11).

The aperture plate 21U is provided on one side thereof with an association arm 21u which extends toward the aperture plate 21D. The association arm 21u is connected to the aperture plate 21D by a pivoting arm 23. The pivoting arm 23 is pivoted to the camera body by a pivot shaft 24 at an intermediate part of the pivoting arm. The pivoting arm 23 is provided on the opposite ends thereof with elongated holes 23a and 23b in which pins 25 and 26 provided on the association arm 21u and the aperture plate 21D are fitted, respectively. Consequently, when either one of the upper or lower aperture plates 21U and 21D is moved up or down, a symmetrical upward or downward movement of the other aperture plate occurs, with respect to the optical axis O. The upper and lower aperture plates 21U and 21D are continuously biased by a tensile spring 27 in a direction to increase the distance therebetween. The upward movement of the aperture plate 21U is restricted by a stop pin 27S which comes into contact with the upper surface of the aperture plate 21U.

The aperture plate 21R is provided on the upper end thereof with an association arm 21r which extends toward the aperture plate 21L and which is connected to the aperture plate 21L by a pivoting arm 28. The pivoting arm 28 is pivoted at an intermediate point thereof to the camera body (stationary portion) by a pivot shaft 29. The pivoting arm 28 is provided on the opposite ends thereof with elongated holes 28a and 28b in which pins 31 and 32, provided on the association arm 21r and the aperture plate 21L, are fitted respectively. Consequently, when one of the left or right aperture plates 21L and 21R is moved laterally, a symmetrical lateral movement of the other aperture plate occurs, with respect to the optical axis O. The aperture plates 21R and 21L are continuously biased by a tensile spring 33 in a direction to increase the distance therebetween. The lateral movement of the aperture plate 21R is restricted by a stop pin 33S which comes into contact with a drive arm 34 provided on the aperture plate 21R.

Moreover, the pin 31 provided on the association arm 21r of the aperture plate 21R is engaged by an oblique cam surface 35 formed on the aperture plate 21U. The pin 31 and the cam surface 35 cause the aperture plate 21U to move downward when the aperture plate 21R is moved toward the optical axis O against the tensile spring 33. The downward movement of the aperture plate 21U caused by the pin 31 is restricted by a flat surface 35S, of the aperture plate 21U, connected to the oblique cam surface 35.

The aperture plate 21U is provided with a drive arm 36 which extends in a parallel direction with the drive arm 34 of the aperture plate 21R. The drive arms 34 and 36 are engaged by drive pins 41 and 42 provided on a peripheral surface of a switching gear 40. The switching gear 40 is in mesh with a rack 45 provided on a photographing mode varying plate 44, so that when the latter is laterally moved by an operation knob 46, the switching gear 40 is rotated. The mode varying plate 44 and the switching gear 40 are shown in a position corresponding to the standard picture mode in FIGS. 9 and 11, in which the four aperture plates 21U through 21L define a standard size aperture (or are located out of the stationary aperture 22).

Figure 12:
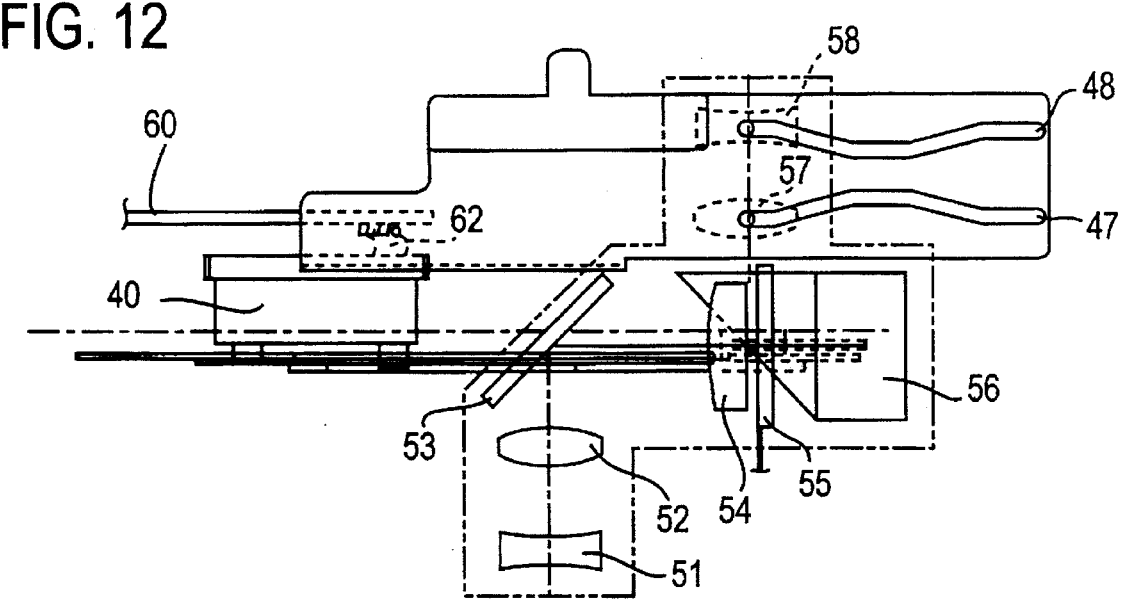
FIG. 12 is a plan view of the aperture varying mechanism shown in FIG. 9, in a panoramic picture mode.
Figure 13:
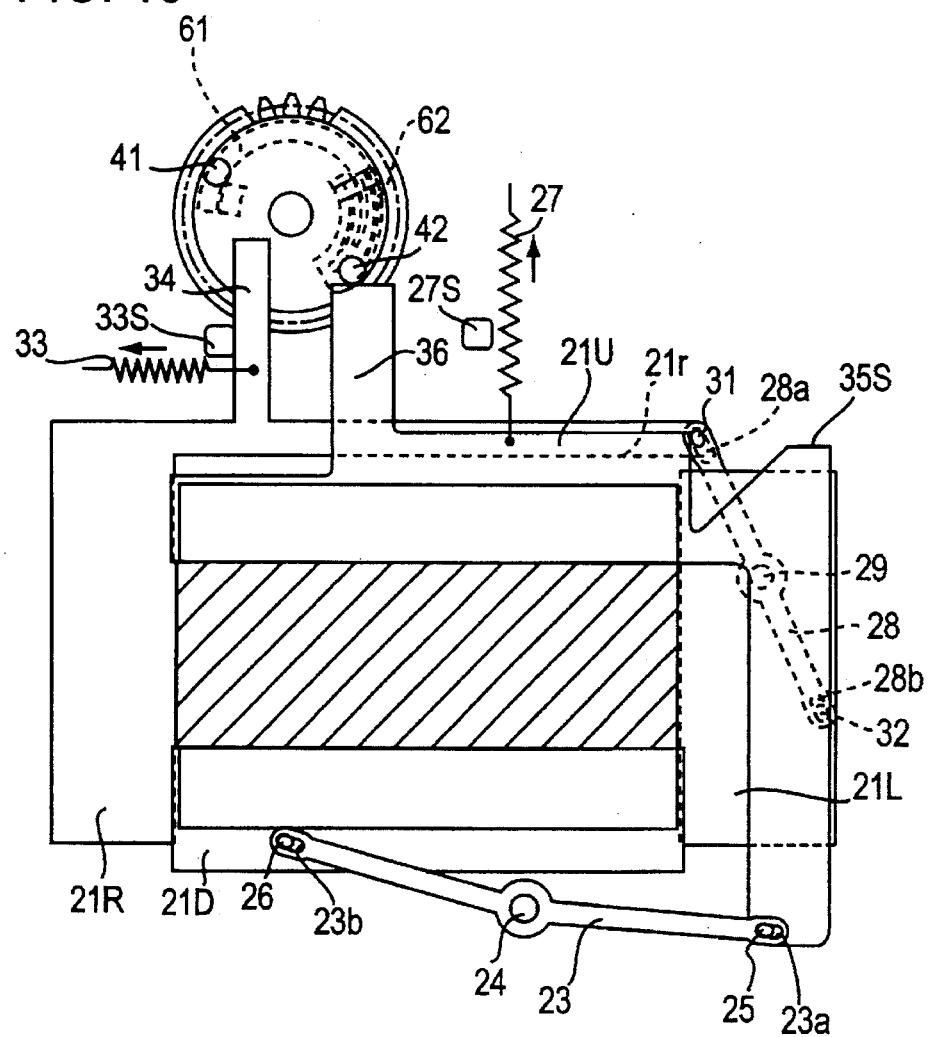
FIG. 13 is a front elevational view of the aperture varying mechanism shown in FIG. 9, in a panoramic picture mode.

When the mode varying plate 44 is moved in the right hand direction in the standard picture mode, as shown in FIGS. 9 and 11, the switching gear 40 is rotated in the clockwise direction through the rack 45, so that the drive pin 42 pushes the drive arm 36 to thereby move the aperture plate 21U in the downward direction. The downward movement of the aperture plate 21U causes the aperture plate 21D, which is associated with the aperture plate 21U through the pivoting arm 23 to move in the upward direction. Note that since the drive pin 41 is disengaged from the drive arm 34, no movement of the aperture plates 21R and 21L takes place. Consequently, the panoramic size aperture is defined by the upper and lower aperture plates 21U and 21D (FIGS. 12 and 13).

Figure 14:
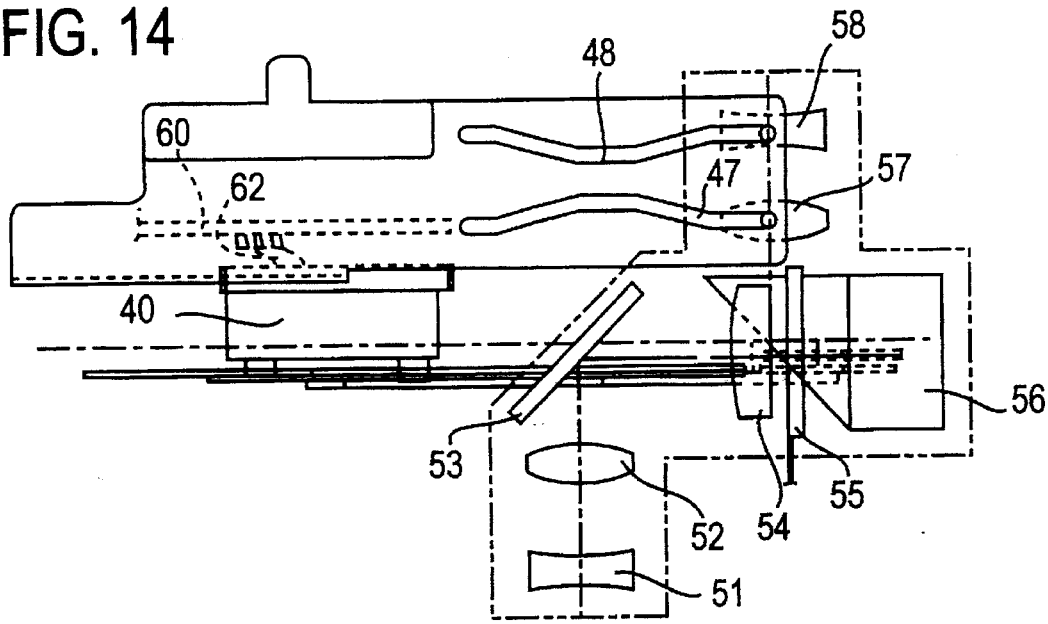
FIG. 14 s a plan view of the aperture varying mechanism shown in FIG. 9, in a pseudo telephoto mode.
Figure 15:
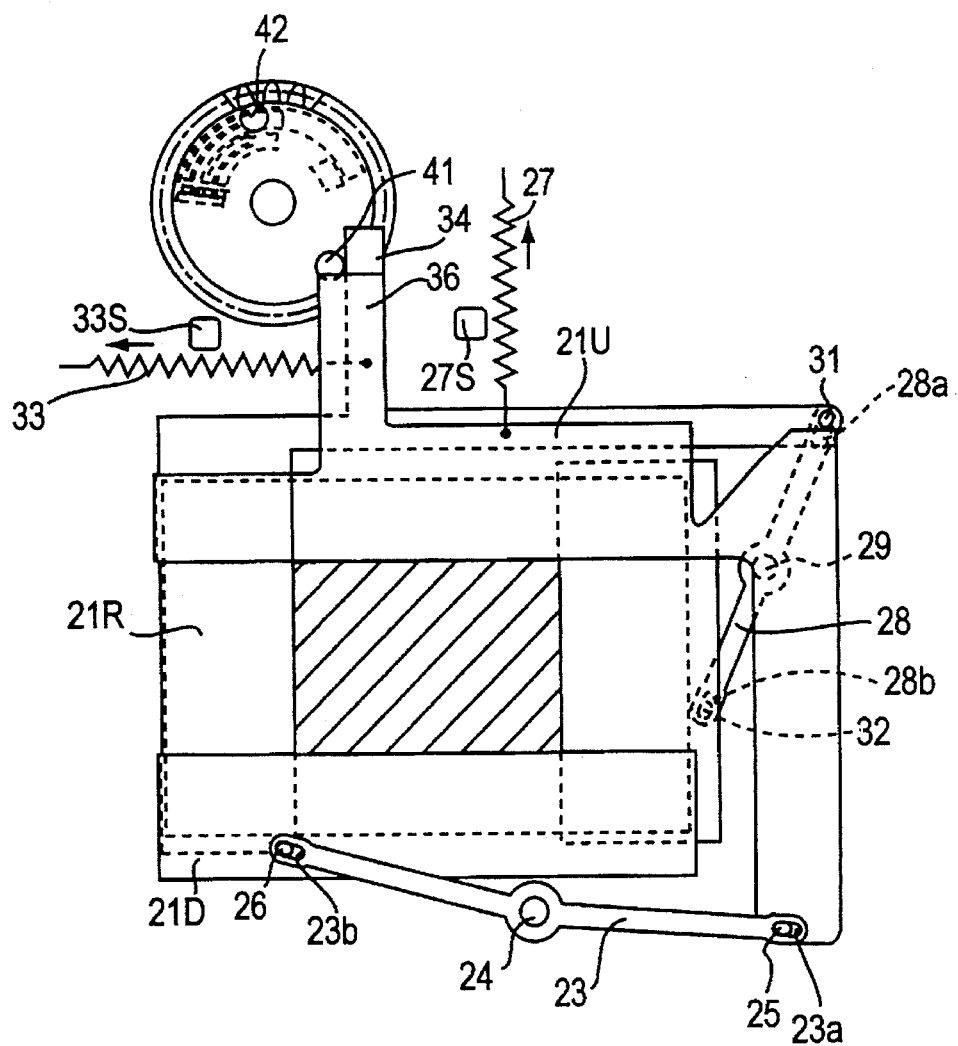
FIG. 15 is a front elevational view of the aperture varying mechanism shown in FIG. 9, in a pseudo telephoto mode.

When the mode varying plate 44 is moved in the left hand direction in FIGS. 9 and 11, the switching gear 40 is rotated in the counterclockwise direction through the rack 45, so that the drive pin 41 pushes the drive arm 34 to thereby move the aperture plate 21R toward the optical axis O. The lateral movement of the aperture plate 21R causes the aperture plate 21L, which is associated with the aperture plate 21R through the pivoting arm 28, to move toward the optical axis O. At the same time, the pin 31 of the association arm 21r pushes the oblique cam surface 35 to move the aperture plate 21U in the downward direction, and hence, the aperture plate 21D moves upward. Consequently, the pseudo telephoto size aperture is defined by the four aperture plates 21U through 21L (FIGS. 14 and 15).

The mode varying plate 44 also varies the field of view of the finder in accordance with the standard picture mode, the panoramic picture mode and the pseudo telephoto mode. The finder optical system is comprised of a first lens 51 of an objective lens system, a second lens 52, a mirror 53, a third stationary lens 54, an LCD 55, an image erecting prism 56, a first movable lens 57, and a second movable lens 58, in this order from the object side. The first movable lens 57 and the second movable lens 58 are provided with cam followers (pins) 57a and 58a integral therewith, that are fitted in cam grooves 47 and 48 formed in the mode varying plate 44, respectively. Consequently, when the mode varying plate 44 is laterally moved, the first and second movable lenses 57 and 58 are moved in the optical axis direction in accordance with the profiles of the cam grooves 47 and 48, so that magnifications for the standard picture mode, the panoramic picture mode, and the pseudo telephoto mode can be obtained.

Electrical data regarding the standard picture mode, the panoramic picture mode, and the pseudo telephoto mode can be obtained through an arched code plate 61 provided on a substrate 60 which is located at the back of the switching gear 40, and a brush 62 which is secured to the switching gear 40 so as to come into contact with the code plate 61. The LCD 55 varies the field of view of the finder in accordance with the picture mode data. FIG. 17 shows the visual fields FR, FP and FG for the standard picture mode, the panoramic picture mode and the pseudo telephoto mode, respectively. The marks 14 and 15 shown in FIG. 17 are lit in the pseudo telephoto mode and the panoramic picture mode, respectively.

Figure 16:
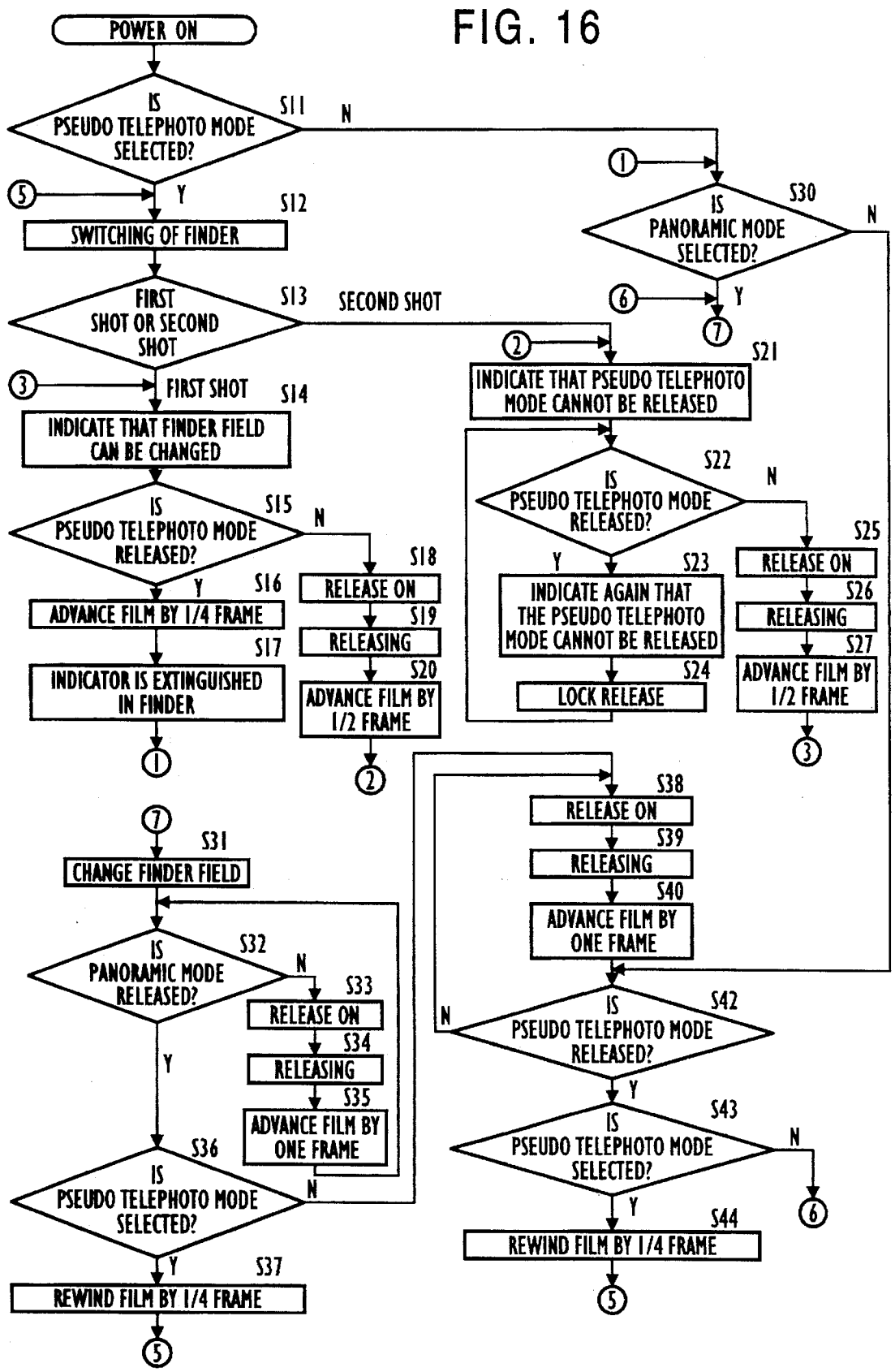
FIG. 16 is a flow chart showing control operations of a camera having a pseudo telephoto (photographing) mode, a panoramic picture (photographing) mode, and a standard picture (photographing) mode.
Figure 17A:
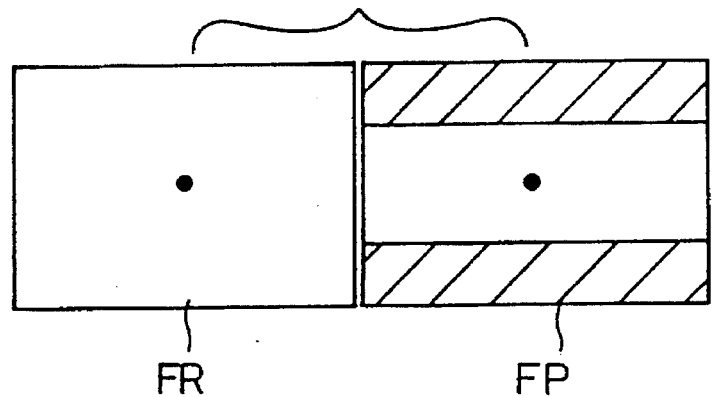
FIG. 17 is a plan view of a finder field of view of a camera having a pseudo telephoto (photographing) mode, a panoramic picture (photographing) mode, and a standard picture (photographing) mode.
Figure 17B:
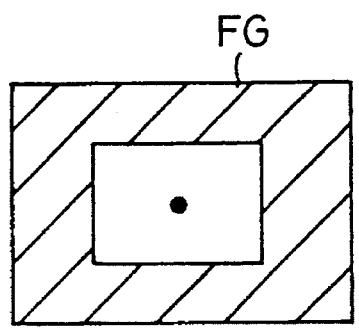
Figure 17C:
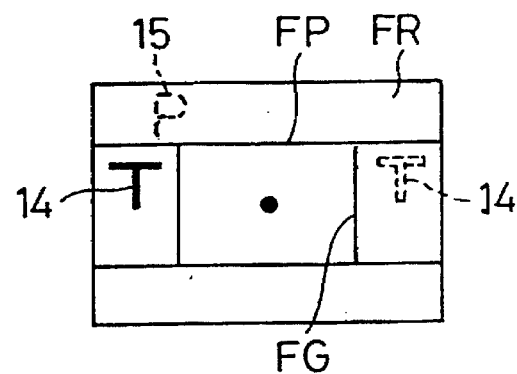
Figure 17D:
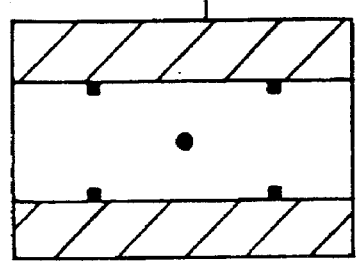

FIG. 16 shows a flow chart of the control operations in the pseudo telephoto mode (regarded as the main mode) and the standard picture mode and the panoramic picture mode. If the mode is Judged to be in the pseudo telephoto made at step S11, the finder visual field is converted to that for the pseudo telephoto mode (step S12). Thereafter, whether the shot is the first shot or the second shot is checked. If the shot is the first shot, only one from a pair of pseudo telephoto mode indicating marks (indicators) 14 is lit (steps S13, S14). In this state, the pseudo telephoto mode can be released. Therefore, whether the pseudo telephoto mode is released is checked (step S15). If the pseudo telephoto mode is released, the film is advanced by ¼ frame, and the indicator is extinguished (steps S16, S17). If the pseudo telephoto mode is detected at step S15, the control does not proceed until the releasing operation is carried out. Thereafter, the film is fed by ½ frame to prepare for the subsequent pseudo telephoto shot (steps S18 through S20).

If the second pseudo telephoto shot is detected at step S13, the mark (indicator) is flickered for a certain time to indicate that the pseudo telephoto mode cannot be released (step S21). Nevertheless, if the user attempts to release the pseudo telephoto mode, the mark is flickered again and the release is locked. If the pseudo telephoto shot is effected, the release operation is carried out to advance the film by ½ frame for the subsequent shot (steps S25 through S27).

If the mode is not in the pseudo telephoto mode at step S11, whether the panoramic picture mode is selected is checked at step S30. If the panoramic picture mode is selected, the visual field of the finder is converted to a field of view for the panoramic shot (step S31). Thereafter, whether the panoramic picture mode is released is checked. If the panoramic picture mode is not released, no control operations proceed until the releasing operation is carried out. Upon releasing, the normal film winding operation is carried out (steps S32 through S35). If the panoramic picture mode is released, whether the pseudo telephoto mode is selected is checked. If the pseudo telephoto mode is selected, the film is rewound by ¼ frame (step S37) to enter the routine for the pseudo telephoto mode.

If no pseudo telephoto mode is selected at step S36, that is, if the standard picture mode is selected, the releasing operation is carried out, and the film is wound (steps S38 through S40). Thereafter, whether the standard picture mode is selected is checked again (step S42). If the standard picture mode is selected (i.e. the pseudo telephoto mode is not selected), the releasing operation and the film winding operation are repeated at steps S38 through S40. The same is true when the standard picture mode is selected at step S30 (i.e. the panoramic mode is not selected).

If the standard picture mode is converted to another mode, whether the pseudo telephoto mode is selected is checked (steps S42 and S43). If no pseudo telephoto mode is selected (step S43), that is, if the panoramic picture mode is selected, the control enters the routine for the panoramic shot. If the pseudo telephoto mode is selected, the control enters the routine for the pseudo telephoto shot (step S44).

Note that in the aperture varying mechanism shown in FIGS. 9 through 15, the first mask 11 and the second mask 12 shown in FIG. 3 can be also realized by alternately moving the right and left aperture plates 21R and 21L.

Figure 18:
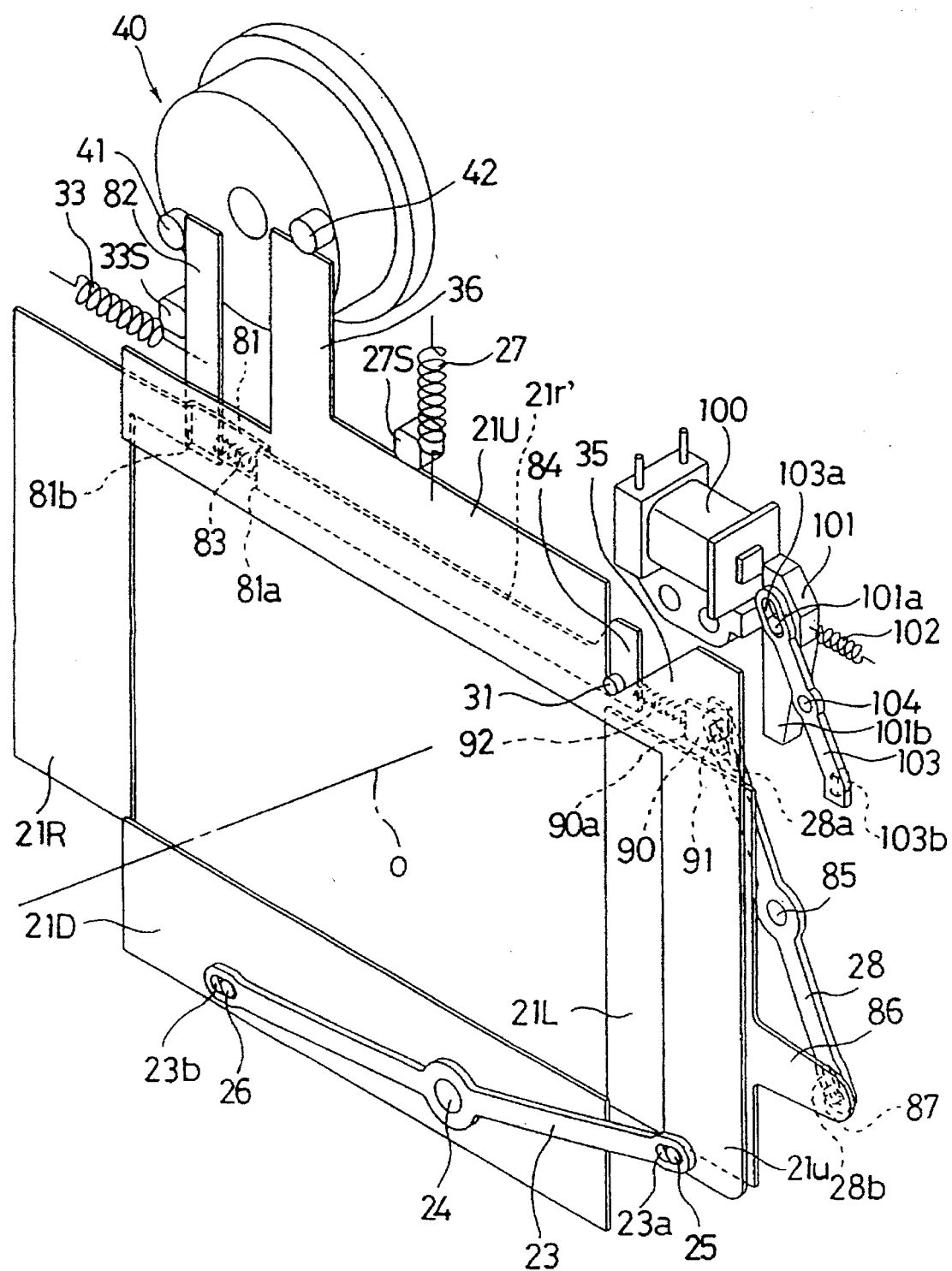
FIG. 18 is a perspective view of a second embodiment of an aperture varying mechanism to select a standard picture photographing aperture, a panoramic picture photographing aperture, and a pseudo telephoto picture photographing aperture.

FIGS. 18 through 22 show a second embodiment of an aperture varying mechanism. In the second embodiment, a mechanism, which moves the aperture for the pseudo telephoto picture in the direction opposite to the direction of the feed of the film by a predetermined displacement when the picture for the second pseudo telephoto frame $t_2$ is taken after the picture for the first pseudo telephoto frame $t_1$ is taken, is provided in addition to the basic structure of the aperture varying mechanism according to the first embodiment. With this arrangement, there is no unexposed portion produced between the first and second pseudo telephoto frames $t_1$ and $t_2$ of the film, and accordingly, the existing automatic printing system in a photofinishing laboratory can be effectively and advantageously employed, as will become apparent from the following discussion. In the second embodiment, the elements corresponding to those in the first embodiment are designated by the same numerals. In FIG. 18, the mode changing plate 44 and the finder optical system, etc., shown in FIG. 9 are omitted.

The aperture plate 21R is provided with an association arm 21r' which places the association arm 21r of the first embodiment. The association arm 21r' is provided with a recess 81, which is recessed backward in the optical axis direction, in the vicinity of the connecting portion thereof with the aperture plate 21R. The recess 81 has a predetermined width, formed in the lengthwise direction of the association arm 21r'. The lower end of a drive arm 82, corresponding to the drive arm 34 in the first embodiment, is positioned in the recess 81. The drive arm 82, which is made of a separate piece from the association arm 21r', is supported by a guide support (not shown) formed in the camera body to slide in the lateral direction (i.e., the feed direction of the film). A compression spring 83 is provided in a compressed state in the recess 81, between one side wall 81a of the recess 81 and the lower end of the drive arm 82. Consequently, the lower end of the drive arm 82 is continuously pressed against the other side wall 81b of the recess 81 by the spring force of the compression spring 83.

The pivoting arm 28 is pivoted at the intermediate point thereof to the camera body (stationary portion) by a pivot shaft 85. A pin 87 provided at the end of a laterally outward extending projection 86, which is in turn provided on the aperture plate 21L, is fitted in an elongated hole 28b provided on the pivoting arm 28. A pin 91 provided on an intermediate sliding member 90 is fitted in another elongated hole 28a of the pivoting arm 28. The intermediate sliding member 90 is supported by a guide support (not shown), formed in the camera body, to slide in the lateral direction within a predetermined limit. A compression spring 92 is provided between the end 90a of the intermediate sliding member 90, that is opposed to the association arm 21r', and the end 84 of the association arm 21r', so that the compression spring 92 is connected at opposite ends thereof to the end 90a and the end 84, respectively. The spring force of the compression spring 92 is weaker than the spring force of the compression spring 83.

There is a solenoid 100 secured to the camera body above the intermediate sliding member 90. A laterally slidable metal piece 101 is provided in the vicinity of the solenoid 100, so that when the solenoid 100 is activated, the metal piece 101 is attracted by the solenoid. The metal piece 101 is normally biased in a direction away from the solenoid 100 by a tensile spring 102. The metal piece 101 is magnetically attracted by the solenoid 100 against the tensile spring 102 when the latter is activated. The magnetic attraction of the solenoid 100 is stronger than the sum of the spring forces of the springs 83 and 102.

A small pivoting arm 103 is provided in the vicinity of the metal piece 101. The small pivoting arm 103 is pivoted at an intermediate point thereof to the camera body (stationary portion) by a shaft 104. The small pivoting arm 103 is provided at one end thereof with an elongated hole 103a in which a pin 101a, provided on the metal piece 101, is fitted. The small pivoting arm 103 is provided on the other end with an abutment 103b which can be engaged by the intermediate sliding member 90.

Figure 19:
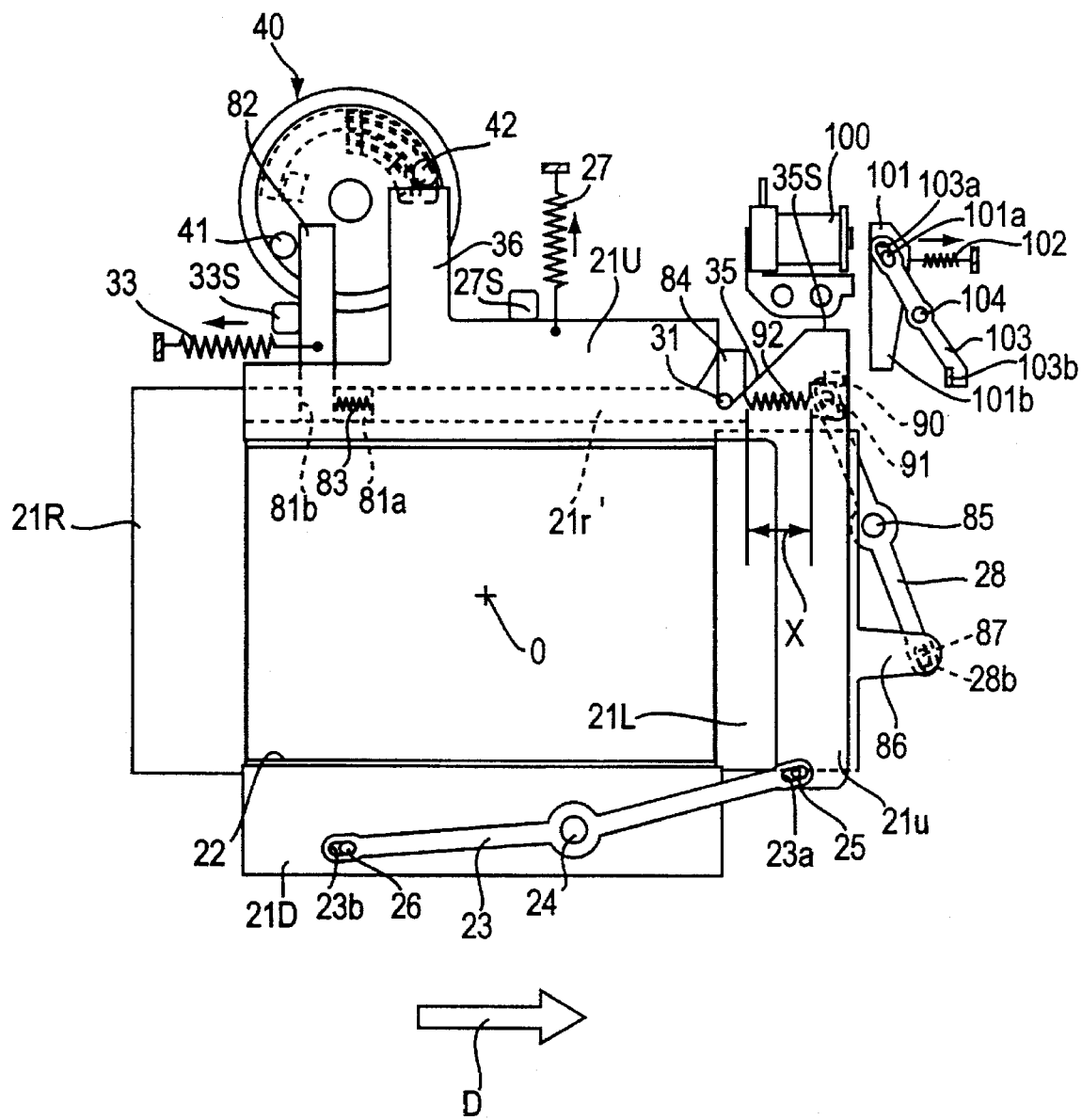
FIG. 19 is a front elevational view of the aperture varying mechanism shown in FIG. 18, in a standard picture mode.
Figure 20:
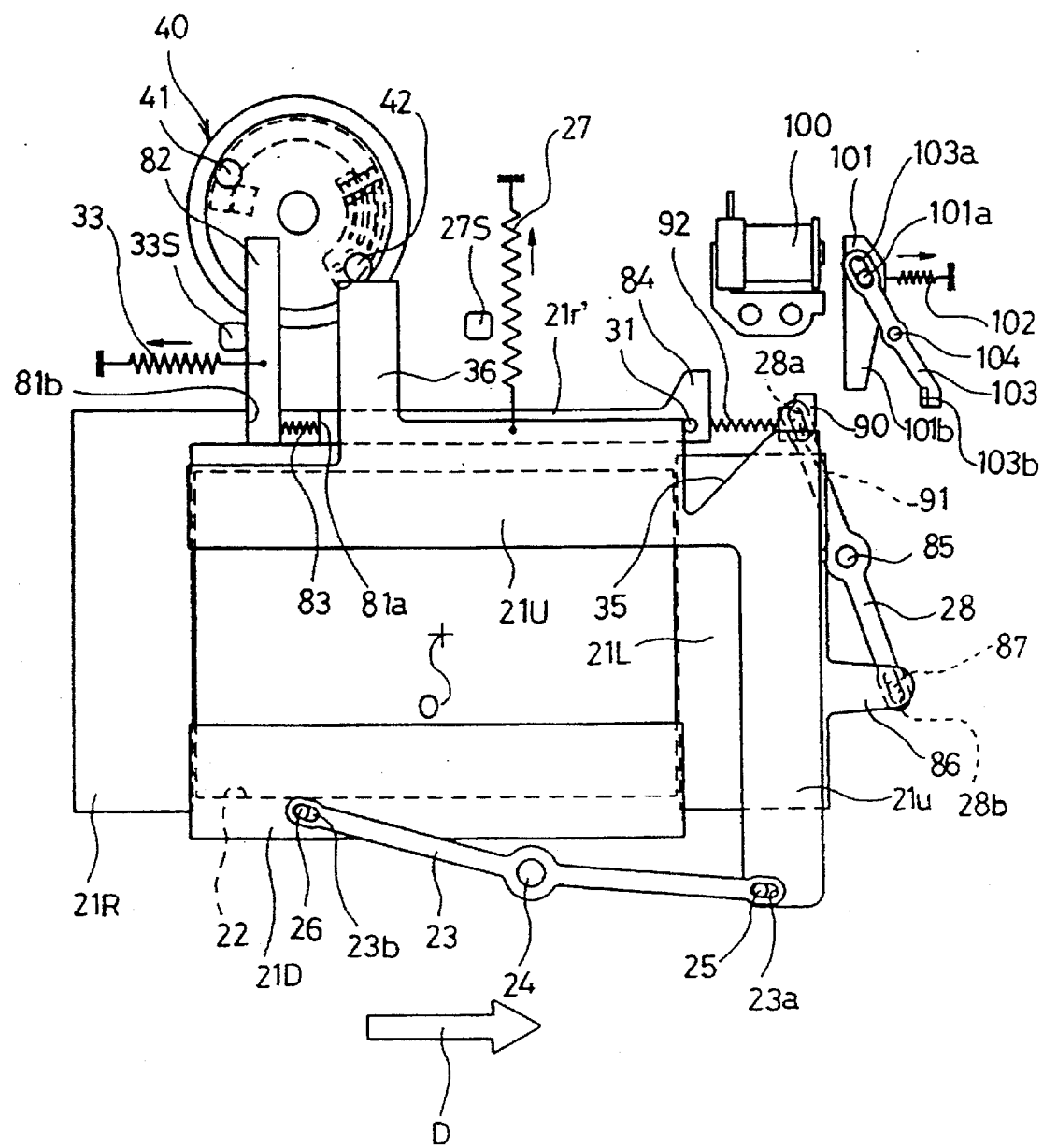
FIG. 20 is a front elevational view of the aperture varying mechanism shown in FIG. 18, in a panoramic picture mode.

The operation of the aperture varying mechanism according to the second embodiment will now be described below with reference to FIGS. 19 through 22. In these drawings, the arrow "D" represents the direction of the feed of the film. In FIG. 19, the elements are shown in the standard picture mode, similar to FIG. 18. When the mode varying plate 44 is moved in the right hand direction as in the standard picture mode shown in FIG. 19, the switching gear 40 is rotated in the clockwise direction through the rack 45 (FIG. 9), so that the drive pin 42 pushes the drive arm 36 to thereby move the aperture plate 21U in the downward direction. The downward movement of the aperture plate 21U causes the aperture plate 21D, which is associated with the aperture plate 21U through the pivoting arm 23, to move in the upward direction. Note that since the drive pin 41 is disengaged from the drive arm 82, no movement of the aperture plates 21R and 21L takes place. Consequently, the panoramic size aperture is defined by the upper and lower aperture plates 21U and 21D (FIG. 20). When the mode is transferred from the standard picture mode to the panoramic picture mode or vice versa, the solenoid 100 is inactive. The metal piece 101 is kept away from the solenoid 100 shown in FIG. 19 at a predetermined distance when the solenoid 100 is turned OFF, and is continuously biased in the right hand direction in FIG. 19 by the spring 102. The metal piece 101 cannot move, in the right hand direction, beyond the position shown in FIG. 19. Note that the compression spring 92 has a predetermined length "x" in FIGS. 19 and 20.

Figure 21:
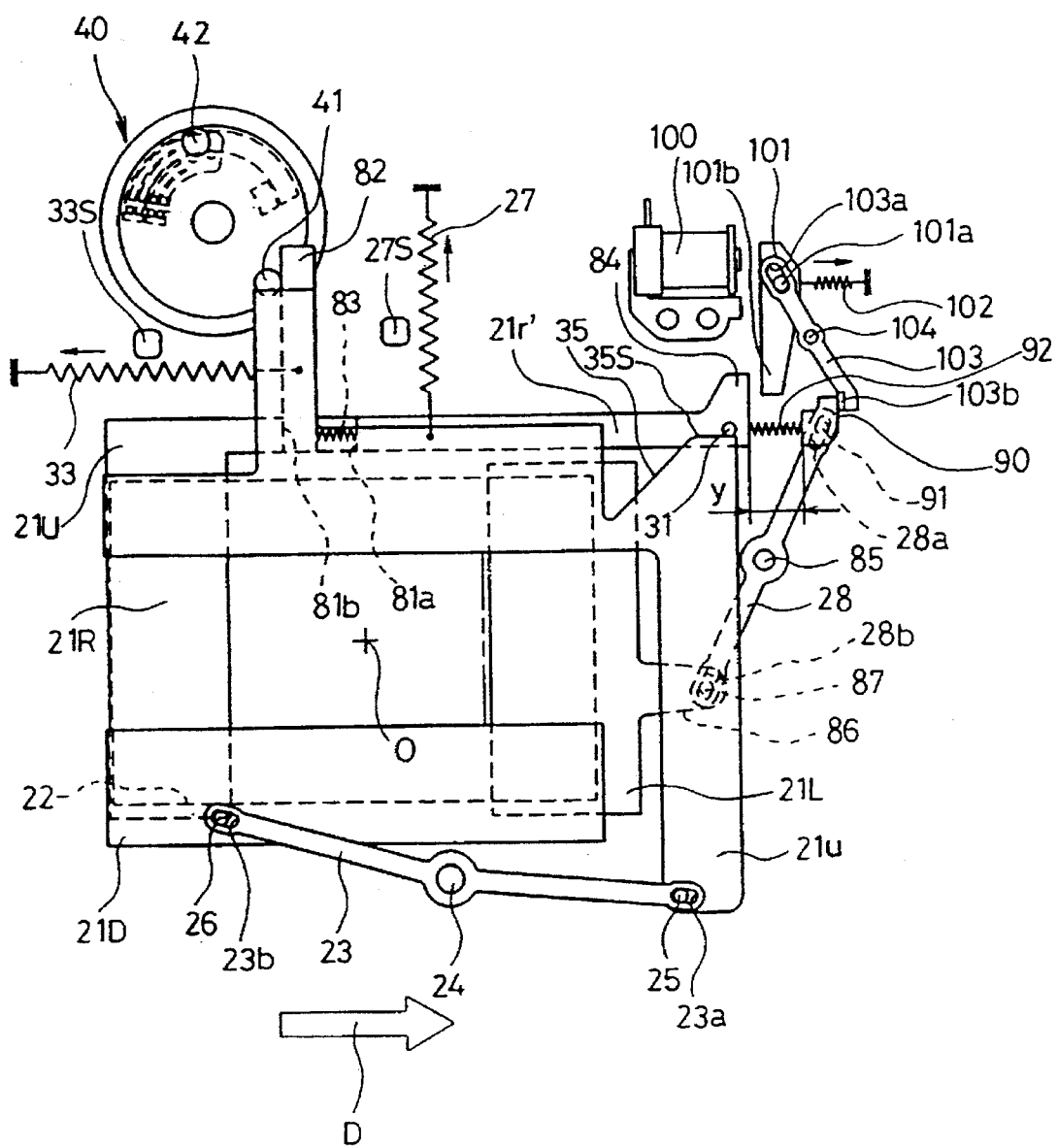
FIG. 21 is a front elevational view of the aperture varying mechanism shown in FIG. 18, in a pseudo telephoto mode when a first frame is taken.
Figure 22:
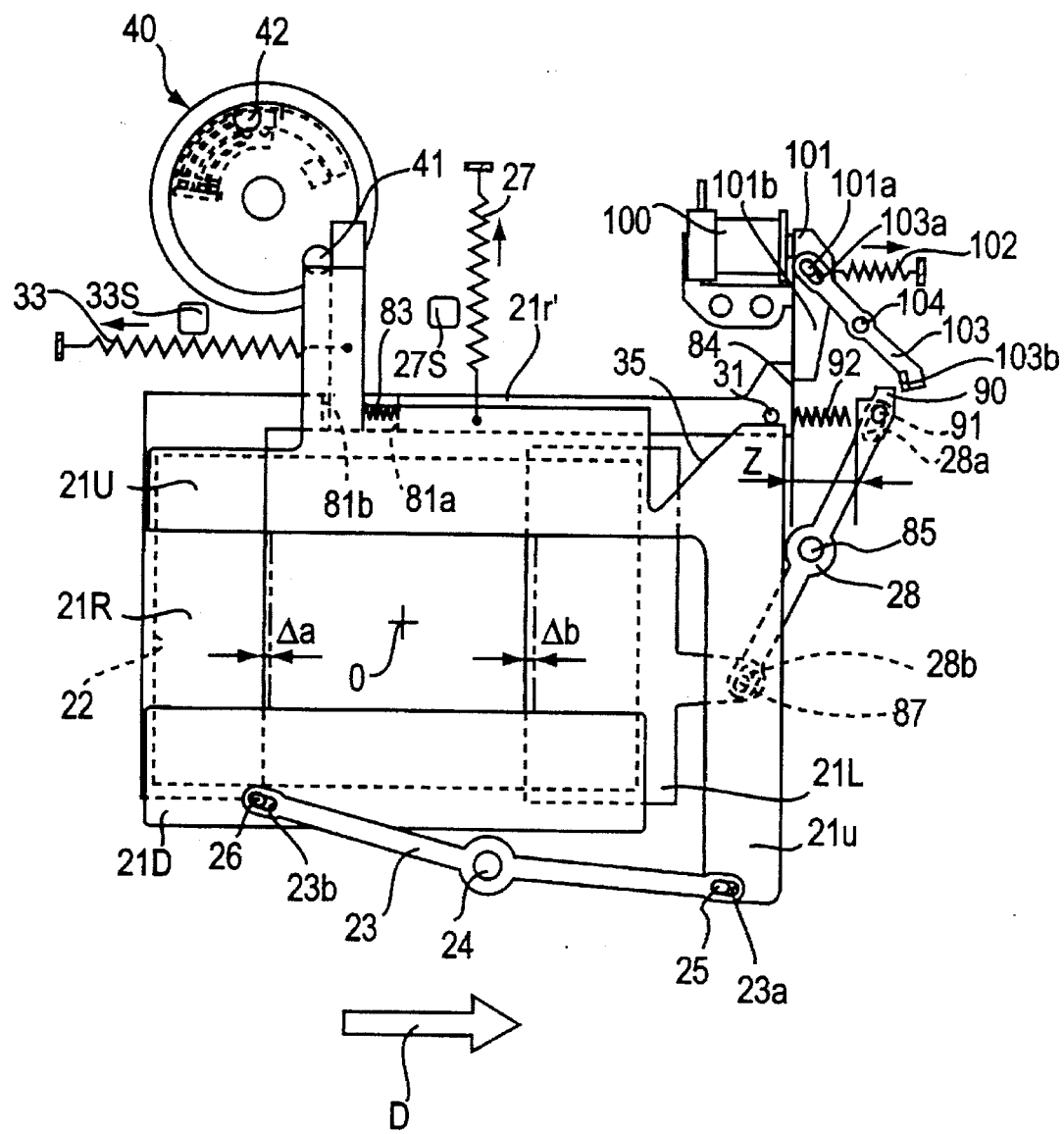
FIG. 22 is a front elevational view of the aperture varying mechanism shown in FIG. 18, in a pseudo telephoto mode when a second frame is taken.

When the mode varying plate 44 is moved in the left hand direction in FIG. 19, the switching gear 40 is rotated in the counterclockwise direction through the rack 45, so that the drive pin 41 pushes the drive arm 82 to move the association arm 21r' and accordingly the aperture plate 21R toward the optical axis O through the compression spring 83. The movement of the aperture plate 21R causes the aperture plate 21L, which is associated with the aperture plate 21R through the compression spring 92, the intermediate sliding member 90 and the pivoting arm 28 to move toward the optical axis O. At the same time, the intermediate sliding member 90 pushes the abutment 103b of the small pivoting arm 103, so that the compression spring 92 is compressed between the end 90a (FIG. 18) of the sliding member 90 and the end 84, to reduce the length of the spring 92 to be "y". Also, the pin 31 of the association arm 21r' pushes the cam surface 35 to move the aperture plate 21U in the downward direction, and hence, the aperture plate 21D moves upward. Consequently, the pseudo telephoto size aperture is defined by the four aperture plates 21U through 21L (FIG. 21). The first pseudo telephoto frame is taken when the aperture varying mechanism is in the position shown in FIG. 21.

Upon the completion of photographing of the first pseudo telephoto frame, the solenoid 100 is activated prior to the second shot in the pseudo telephoto mode. Consequently, the metal piece 101 is attracted by the solenoid 100, so that the lower end 101b of the metal piece 101 pushes the end 84 of the association arm 21r' in the left hand direction against the compression spring 83. Consequently, the aperture plate 21R is moved in the left direction (opposite to the feed direction D of the film) by the displacement Δa. At the same time, the small pivoting arm 103 is rotated in the counterclockwise direction in FIG. 22, so that the abutment 103b of the small pivoting arm 103 is disengaged from the intermediate sliding member 90. As a result, the compressed compression spring 92 is restored to its initial state, having a length "z", to move the intermediate sliding member 90 in the right hand direction. Thus, the aperture plate 21L is moved in the left direction by the displacement Δb through the pivoting arm 28. The displacements Δa and Δb are identical. Also, the lengths "x" and "z" of the spring 92 are identical. The length y of the spring 92 is equal to the length "x" (or "z") minus the displacement Δa (or Δb). At the second shot in the pseudo telephoto mode (second pseudo telephoto frame), the aperture formed upon the first shot at the pseudo telephoto mode (first pseudo telephoto frame) is shifted entirely in the left direction in FIG. 22 by the displacement Δa (or Δb). The second shot for the second pseudo telephoto frame is carried out in the position shown in FIG. 22.

Figure 24:
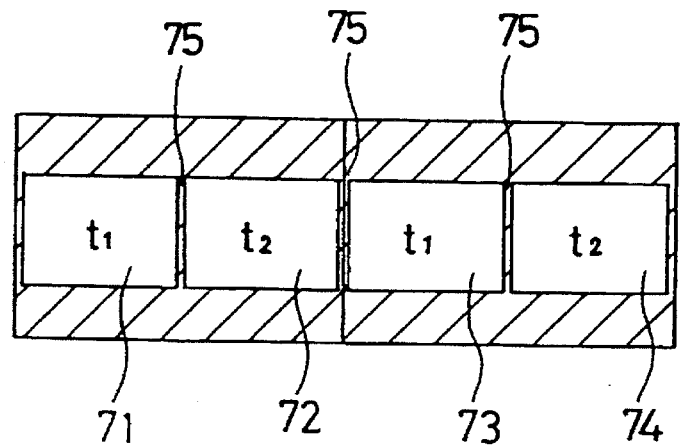

Upon the pseudo telephoto shot, executed using the mask 13 or the aperture varying mechanism according to the first embodiment at the pseudo telephoto mode as shown in FIG. 6 or 7, for instance, if a pair of pseudo telephoto frames are photographed after another pair of pseudo telephoto frames are photographed, four consecutive separate frames 71, 72, 73 and 74 of the film are exposed, as shown in FIG. 24. When this film is printed, there is a possibility that the automatic printing apparatus in a laboratory cannot identify the pair of the frames corresponding to one panoramic size frame due to the unexposed portions 75 formed between the adjacent frames 71 through 74. Consequently, the sensor (not shown) of the automatic printing apparatus in the laboratory may judge that the frames 72 and 73 constitute one pair, although actually, the frames 71 and 72 constitute a first pair and the frames 73 and 74 constitute a second pair, respectively. Moreover, in the case that a manual printing apparatus is used instead of the automatic printing apparatus in the laboratory, if a pair of pseudo telephoto frames are printed at a panoramic size, an unsightly black line corresponding to the unexposed portion 75 appears on the center portion of the print. Furthermore, in a manual printing apparatus, it is also difficult for an operator to judge a pair of associated pseudo telephoto frames.

Figure 23:
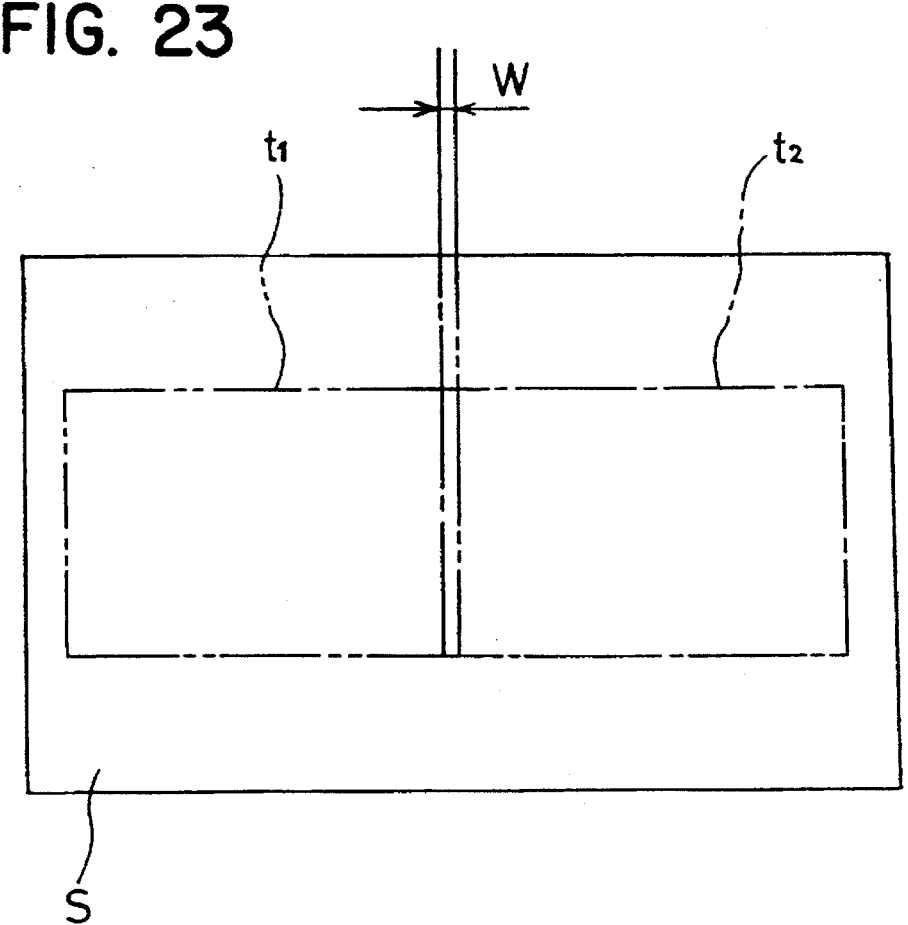
FIG. 23 is a view of two pseudo telephoto frames $t_1$ and $t_2$ which are taken in a superimposed state; and, FIG. 24 is a view of two pseudo telephoto frames $t_1$ and $t_2$ which are taken in a juxtaposed state.

The problem mentioned above can be solved when the pseudo telephoto shots, in the pseudo telephoto mode shown in FIG. 6 or 7, are effected using the aperture varying mechanism according to the second embodiment. Namely, since the aperture formed to photograph the first pseudo telephoto frame is shifted in the direction opposite to the feed direction of the film by the displacement Δa (or Δb) when the predetermined second pseudo telephoto frame is photographed, the pseudo telephoto frames $t_1$ and $t_2$ partly overlap as indicated at "w" in FIG. 23 upon photographing. Note that the displacement Δa (or Δb) is set to be greater than the width of the unexposed portions 75 in FIG. 24. For example, the width of the unexposed portions 75 is 1 mm, and the displacement Δa (Δb) is 2 mm. In this example, the width "w" is 1 mm. Thus, due to an absence of the unexposed portion between the adjacent pseudo telephoto frames $t_1$ and $t_2$, the above mentioned problem can be eliminated. The overlapped portion of the pseudo telephoto frames $t_1$ and $t_2$ is double-exposed, but nevertheless there is no serious problem caused, since the double-exposed portion has a very small width and is cut after being printed. Although the displacement Δa (or Δb) is about 2 mm in the illustrated embodiment, the displacement can be optionally selected so that there is no unexposed portion produced between the adjacent pseudo telephoto frames $t_1$ and $t_2$.

In the aperture varying mechanism in the second embodiment, the entirety of the aperture, which is formed upon photographing the first pseudo telephoto frame $t_1$, is shifted in the direction opposite to the feed direction of the film by a predetermined displacement, but the above-mentioned problem can be solved also by controlling the feed of the film using the mask 13 or the aperture varying mechanism of the first embodiment. Namely, the amount of feed of the film from the first pseudo telephoto frame $t_1$ to the second pseudo telephoto frame $t_2$ in FIGS. 6 and 7 is changed from ½ to ½–Δa (or Δb). In addition, the amount of feed of the film from the second pseudo telephoto frame $t_2$ to the subsequent first pseudo telephoto frame $t_1$ after the preceding first pseudo telephoto frame is photographed is changed from ½ to ½+Δa (or Δb), or the amount of feed of the film from the second pseudo telephoto frame $t_2$ to the subsequent standard picture frame "s", after the first pseudo telephoto frame is photographed, is changed from ¾ to ¾+Δa (or Δb). Thus, the same effect as that expected when the pseudo telephoto shot is performed can be obtained using the aperture varying mechanism of the second embodiment and the pseudo telephoto mode in FIG. 6 or 7.

According to the present invention, the telephoto-effect print can be inexpensively obtained using the existing printing system for panoramic size pictures. Moreover, it is possible to photograph pictures of the pseudo telephoto size, the standard size, and the panoramic size in a mixed state. Consequently, if the standard picture mode is switched to the pseudo telephoto mode and vice versa, a camera having a lens of a fixed focal length can be used as if it is a camera having a lens of switchable dual focal length, or a zoom lens camera having a zoom ratio of 2 or 3 can be used as if it is a zoom lens camera having a zoom ratio of 4 or 6. Moreover, a sub-effect results, in that the number of frames (e.g., 48 frames) to be photographed in the pseudo telephoto mode doubles the number of frames (e.g., 24 frames) to be photographed that can be obtained in the standard picture mode.

Although the invention has been described with reference to particular means, materials and embodiments, it is to be understood that the invention is not limited to the particulars disclosed and extends to all equivalents within the scope of the claims.

We claim:

1. A pseudo telephotographic camera comprising:
   means for defining two pseudo telephotographic frames which together substantially define a panoramic size frame, one of said two pseudo telephotographic frames being formed on a right half of the panoramic size frame, and another of said two pseudo telephotographic frames being formed on a left side of the panoramic size frame, the standard size frame being a reference sized frame and having predetermined major and minor dimensions, the panoramic size frame having major dimensions equal to the major dimensions of the standard size frame and minor dimensions smaller than the minor dimensions of the standard size frame, the telephotographic frames formed on the right and left halves of the panoramic size frame spaced along the major dimension of the panoramic size frame; and means for photographing pictures in each of said two pseudo telephotographic frames independently.

2. The pseudo telephotographic camera according to claim 1, said defining means comprising:
   a mask having an opening corresponding to said pseudo telephotographic frames, said mask located in front of an aperture of the camera; and
   means for moving the film to have a predetermined positional relationship relative to said mask to expose the film.

3. The pseudo telephotographic camera according to claim 2, wherein said aperture defines the standard picture frame.

4. The pseudo telephotographic camera according to claim 1, wherein each of said two pseudo telephotographic frames partly overlap so as not to produce an unexposed portion therebetween upon photographing.

5. The pseudo telephotographic camera according to claim 4, said defining means comprising:
   a mask having an opening corresponding to said pseudo telephotographic frames said mask located in front of an aperture of the camera; and
   means for moving the film to have a predetermined positional relationship relative to said mask to expose the film.

6. The pseudo telephotographic camera according to claim 1, said photographing means further comprising:
   means for performing a photographing operation to photograph pictures in the standard size frame, in the panoramic size frame and in each of the pseudo telephotographic size frames on a film;
   said camera further comprising means for setting said photographing means to photograph pictures in each of the standard, panoramic and pseudo telephotographic size frames; and
   means for moving the film, when said photographing means is set to photograph pictures in the pseudo telephotographic frame size, by a first distance prior to, and by a second distance after a pseudo telephotographic photographing operation, said first and second distances being different from each other.

7. A camera having a pseudo telephotographic mode, comprising:
   means for selecting a standard picture frame, a panoramic picture frame, and two pseudo telephotographic picture frames, one of said two pseudo telephotographic picture frames located on a right half of the panoramic picture frame on a film, and another of said two pseudo telephotographic picture frames located on a left side of the panoramic picture frame on the film, the standard picture frame being a reference sized frame and having predetermined major and minor dimensions, the panoramic picture frame having major dimensions equal to the major dimensions of the standard picture frame and minor dimensions smaller than the minor dimensions of the standard picture frame, the pseudo telephotographic picture frames located on the right and left halves of the panoramic picture frame spaced along the major dimension of the panoramic picture frame; and
   means for photographing pictures in said standard picture frame, said panoramic picture frame, and each of said two pseudo telephotographic picture frames in accordance with the selection of said selecting means.

8. The camera according to claim 7, wherein each of said pseudo telephotographic picture frames partly overlap so as not to produce an unexposed portion therebetween upon photographing.

9. The camera according to claim 7, further comprising:
   four aperture plates which are provided on upper, lower, right and left portions, respectively, in a camera body to independently move between a first position in which the aperture plates are close to an optical axis of a photographic lens and a second position in which the aperture plates are farther away from the optical axis than in the close position, the upper and lower portions being spaced from each other along the minor dimension of the standard frame, the left and right portions being spaced from each other along a major dimension of the standard frame;
   said aperture plates defining a standard frame for a standard picture when the four aperture plates are all located in their respective second positions;
   said aperture plates defining a panoramic frame for a panoramic picture when the upper and lower aperture plates are located in their respective first positions and the right and left aperture plates are located in their respective second positions; and
   said aperture plates defining a pseudo telephotographic frame for a pseudo telephoto picture when the four aperture plates are all located in their respective first positions.

10. The camera according to claim 9, wherein the pseudo telephotographic picture frames are partly overlapped so as not to produce an unexposed portion therebetween upon photographing.

11. The camera according to claim 10, further comprising means for shifting the right and left aperture plates in a direction opposite to the feed direction of a film by a predetermined distance when the aperture plates are all located in their respective close positions to define the pseudo telephotographic aperture.

12. The camera having a pseudo telephotographic mode according to claim 7, further comprising:
   means for feeding the film, when said selecting means has selected one of said two pseudo telephotographing picture frames, by a first distance prior to photographing a picture and by a second distance subsequent to photographing a picture, said first and second distances being different from each other.

13. A method for taking pseudo telephotographic photographs with a camera, said method comprising the steps of:
   defining two separate pseudo telephotographic frames which together substantially define a panoramic size frame, said two separate pseudo telephotographic frames being formed on right and left halves of the panoramic size frame, respectively, the standard size frame being a reference sized frame and having major and minor dimensions, the panoramic size frame having major dimensions equal to the major dimensions of the standard size frame and minor dimensions smaller than the minor dimensions of the standard size frame, the pseudo telephotographic frames formed on the right and left halves of the panoramic size frame spaced along the major dimension of the panoramic size frame; and
   photographing pictures in said two separate pseudo telephotographic frames independently of each other.

14. The method for taking pseudo telephotographic pictures with a camera according to claim 13, further comprising the step of:
   feeding the film, when photographing pictures in said two separate pseudo telephotographic frames, by a first distance prior to a photographing operation and by a second distance after a photographing operation, said first and second distances being different from each other.

15. The method for taking pseudo telephotographic pictures with a camera according to claim 13, further comprising the step of:

positioning each of the two pseudo telephotographic frames to partially overlap each other, whereby an unexposed portion between said two telephotographic frames is not produced upon photographing.

16. A pseudo telephotographic camera comprising:

a plurality of movable members;

means for moving said movable members to define generally rectangular photographing apertures of different sizes, said sizes including a standard frame size having major and minor dimensions, said standard size being a reference sized frame, a panoramic frame size having major dimensions equal to the major dimensions of the standard frame size and minor dimensions smaller than the minor dimensions of the standard frame size, and a pseudo telephotographic frame having a first dimension equal to the minor dimension of the panoramic frame size and a second dimension substantially equal to one-half the major dimension of the panoramic frame size, two of said pseudo photographic frames being formed by said relatively movable members on portions of a panoramic size frame spaced along a direction of film feed; and a mechanism for taking a photograph in each of said two pseudo telephotographic frames independently.

17. The pseudo telephotographic camera according to claim 16, further comprising:

a film feed mechanism for feeding the film in association with photographing of pictures in said two pseudo telephotographic frames independently, such that each pseudo telephotographic picture is taken by light transmitted through a center portion of a photographing lens of the camera.

18. The pseudo telephotographic camera according to claim 17, said film feed mechanism feeding said film such that said pseudo telephotographic frames are partially overlapped so as to eliminate an unexposed portion between said pseudo telephotographic frames upon photographing.

19. The pseudo telephotographic camera according to claim 16, said camera further comprising means for selecting a frame size for photographing; and a film feed mechanism for feeding film, wherein, when said selecting mechanism switches between a standard or a panoramic frame size and said pseudo telephotographic frame size, said feed mechanism feeds said film in a direction opposite to a direction in which said feed mechanism feeds the film when sequential photographs of standard frame size are photographed.

20. The pseudo telephotographic camera according to claim 16, further comprising a mask mounted for insertion into and retraction from a finder optical axis of the camera.

* * * * *